US009871661B2

(12) United States Patent
Kobayashi et al.

(10) Patent No.: US 9,871,661 B2
(45) Date of Patent: Jan. 16, 2018

(54) PROTECTION OF CONTENT BASED ON ENCRYPTION

(75) Inventors: Yoshiyuki Kobayashi, Tokyo (JP); Motoki Kato, Kanagawa (JP); Hiroshi Kuno, Kanagawa (JP); Takamichi Hayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 59 days.

(21) Appl. No.: 14/115,421

(22) PCT Filed: Apr. 13, 2012

(86) PCT No.: PCT/JP2012/060119
§ 371 (c)(1),
(2), (4) Date: Nov. 4, 2013

(87) PCT Pub. No.: WO2012/165062
PCT Pub. Date: Dec. 6, 2012

(65) Prior Publication Data
US 2014/0075195 A1 Mar. 13, 2014

(30) Foreign Application Priority Data

May 27, 2011 (JP) .................................. 2011-118575

(51) Int. Cl.
*H04L 29/06* (2006.01)
*H04L 9/32* (2006.01)
(Continued)

(52) U.S. Cl.
CPC ............ *H04L 9/3268* (2013.01); *G06F 21/10* (2013.01); *G11B 20/00115* (2013.01);
(Continued)

(58) Field of Classification Search
CPC ............ G06F 21/10; G06F 2221/2149; G06F 2221/2107; G11B 20/00297;
(Continued)

(56) References Cited

U.S. PATENT DOCUMENTS 6,901,385 B2* 5/2005 Okamoto et al. ............... 705/51
7,802,306 B1* 9/2010 Adams .................... G06F 21/10
713/155

(Continued)

FOREIGN PATENT DOCUMENTS

JP 2005-129058 5/2005
JP 2007-19685 1/2007
(Continued)

OTHER PUBLICATIONS

Office Action dated Oct. 29, 2013 in Japanese Patent Application No. 2010-092645.
(Continued)

*Primary Examiner* — Techane Gergiso
*Assistant Examiner* — Tri Tran
(74) *Attorney, Agent, or Firm* — Chip Law Group

(57) ABSTRACT

To realize a configuration to output content to a medium and to use the content stored in the medium under control of the use of content.
A content-output-device outputs an encrypted content and an encryption key to be applied to the using process to the medium, and a management server generates a media ID verification value based on a media ID that is an identifier of the medium and transmits the value to the medium. The medium stores the encrypted content, the encryption key, and the media ID verification value in a storage unit. A reproduction device loads the medium and calculates a verification value based on the media ID acquired from the medium, and executes a reproducing process of the encrypted content stored in the medium by data processing to which the encryption key is applied on condition that a matching process performed between the verification value and the media ID verification value stored in the medium is established.

16 Claims, 14 Drawing Sheets

(51) Int. Cl.
*G06F 21/10* (2013.01)
*G11B 20/00* (2006.01)
*H04L 9/08* (2006.01)
*H04N 5/76* (2006.01)
*H04N 5/913* (2006.01)

(52) U.S. Cl.
CPC .. *G11B 20/00224* (2013.01); *G11B 20/00297* (2013.01); *G11B 20/00492* (2013.01); *H04L 9/08* (2013.01); *H04L 9/083* (2013.01); *H04L 9/0822* (2013.01); *H04L 9/0897* (2013.01); *H04L 9/3263* (2013.01); *H04L 63/0823* (2013.01); *H04L 63/0853* (2013.01); *H04N 5/76* (2013.01); *G06F 2221/2149* (2013.01); *H04L 2209/60* (2013.01); *H04L 2463/101* (2013.01); *H04N 2005/91364* (2013.01)

(58) Field of Classification Search
CPC ........ G11B 20/00492; G11B 20/00224; G11B 20/00115; H04L 9/0822; H04L 9/083; H04L 9/0897; H04L 9/3263; H04L 2209/60; H04L 2463/101; H04L 63/0823; H04L 63/0853; H04L 9/3268; H04N 5/76; H04N 2005/91364
See application file for complete search history.

(56) References Cited

U.S. PATENT DOCUMENTS

| | | | |
|---|---|---|---|
| 2004/0190868 | A1* | 9/2004 | Nakano et al. ................ 386/94 |
| 2005/0091507 | A1 | 4/2005 | Lee et al. |
| 2005/0091508 | A1 | 4/2005 | Lee et al. |
| 2006/0179478 | A1* | 8/2006 | Han .................... H04L 9/0822 726/5 |
| 2007/0169203 | A1 | 7/2007 | Kim et al. |
| 2008/0010452 | A1* | 1/2008 | Holtzman ............ H04L 9/3228 713/158 |
| 2009/0006796 | A1* | 1/2009 | Chang et al. ................ 711/163 |

FOREIGN PATENT DOCUMENTS

| | | |
|---|---|---|
| JP | 2008-98765 | 4/2008 |
| JP | 2009-524334 | 6/2009 |
| JP | 2010-28364 | 2/2010 |

OTHER PUBLICATIONS

International Search Report dated Jun. 5, 2012 in PCT/JP2012/060119.

\* cited by examiner

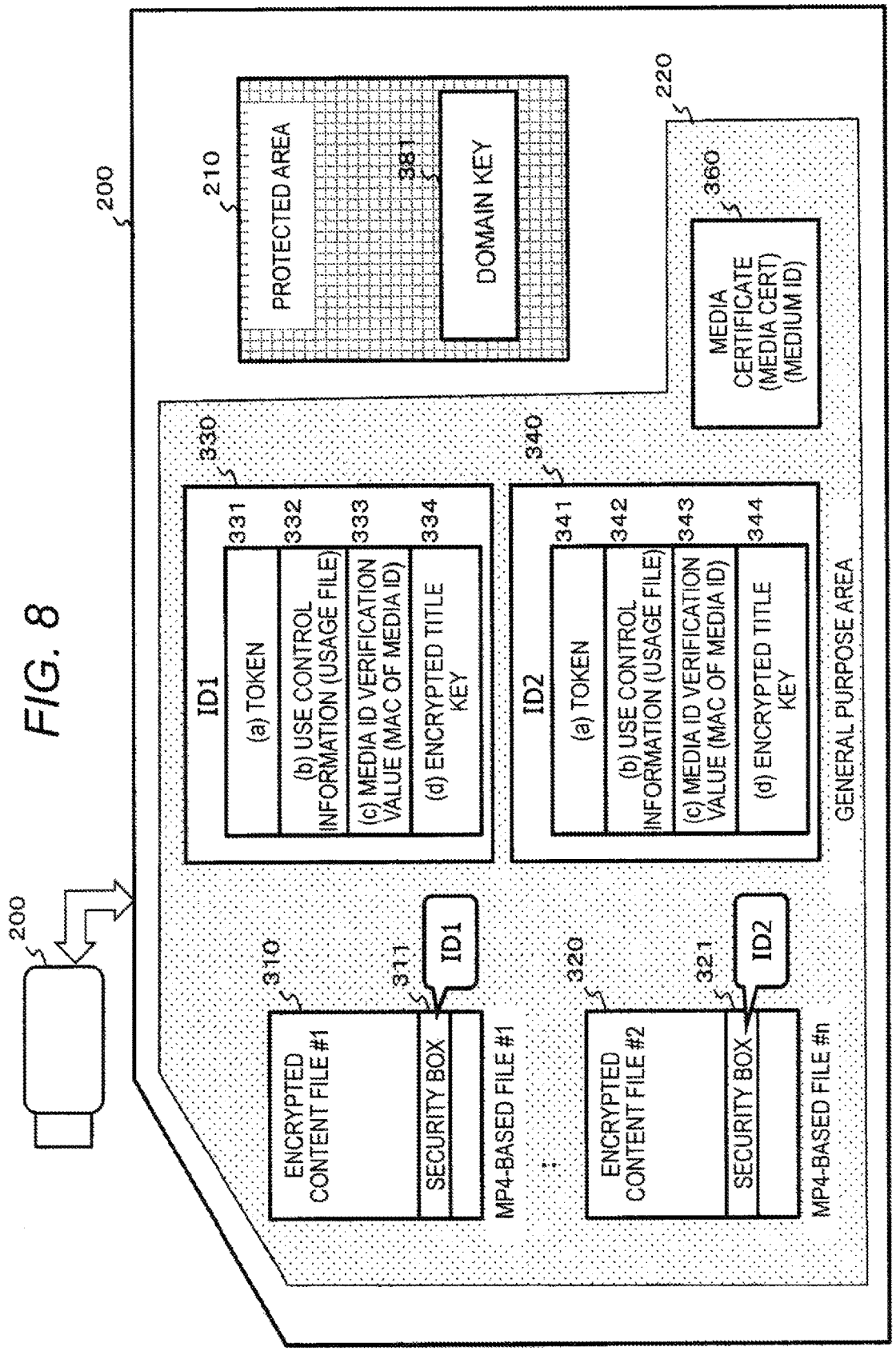

FIG. 9

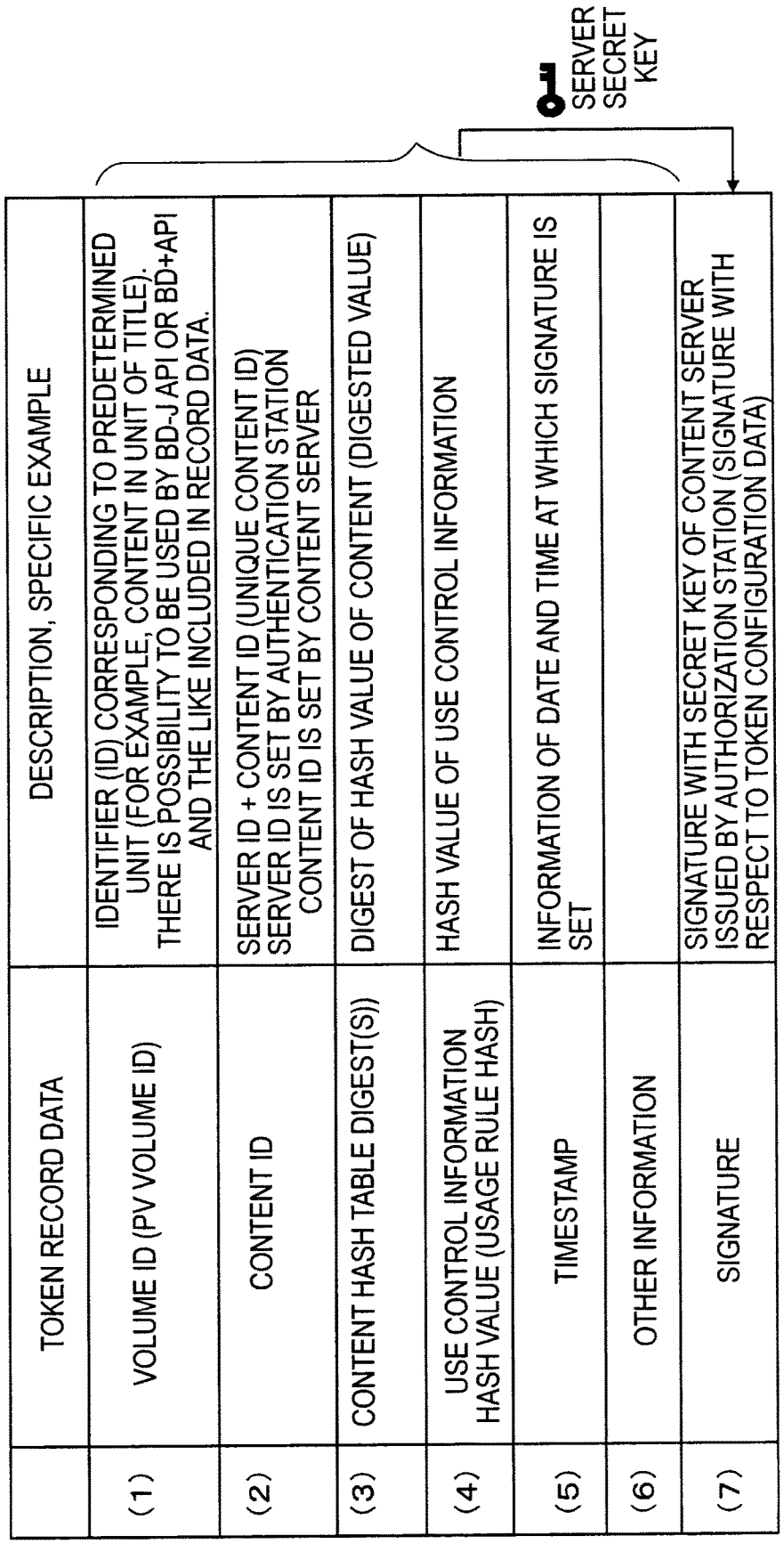

| | TOKEN RECORD DATA | DESCRIPTION, SPECIFIC EXAMPLE |
|---|---|---|
| (1) | VOLUME ID (PV VOLUME ID) | IDENTIFIER (ID) CORRESPONDING TO PREDETERMINED UNIT (FOR EXAMPLE, CONTENT IN UNIT OF TITLE). THERE IS POSSIBILITY TO BE USED BY BD-J API OR BD+API AND THE LIKE INCLUDED IN RECORD DATA. |
| (2) | CONTENT ID | SERVER ID + CONTENT ID (UNIQUE CONTENT ID) SERVER ID IS SET BY AUTHENTICATION STATION CONTENT ID IS SET BY CONTENT SERVER |
| (3) | CONTENT HASH TABLE DIGEST(S) | DIGEST OF HASH VALUE OF CONTENT (DIGESTED VALUE) |
| (4) | USE CONTROL INFORMATION HASH VALUE (USAGE RULE HASH) | HASH VALUE OF USE CONTROL INFORMATION |
| (5) | TIMESTAMP | INFORMATION OF DATE AND TIME AT WHICH SIGNATURE IS SET |
| (6) | OTHER INFORMATION | |
| (7) | SIGNATURE | SIGNATURE WITH SECRET KEY OF CONTENT SERVER ISSUED BY AUTHORIZATION STATION (SIGNATURE WITH RESPECT TO TOKEN CONFIGURATION DATA) |

SERVER SECRET KEY

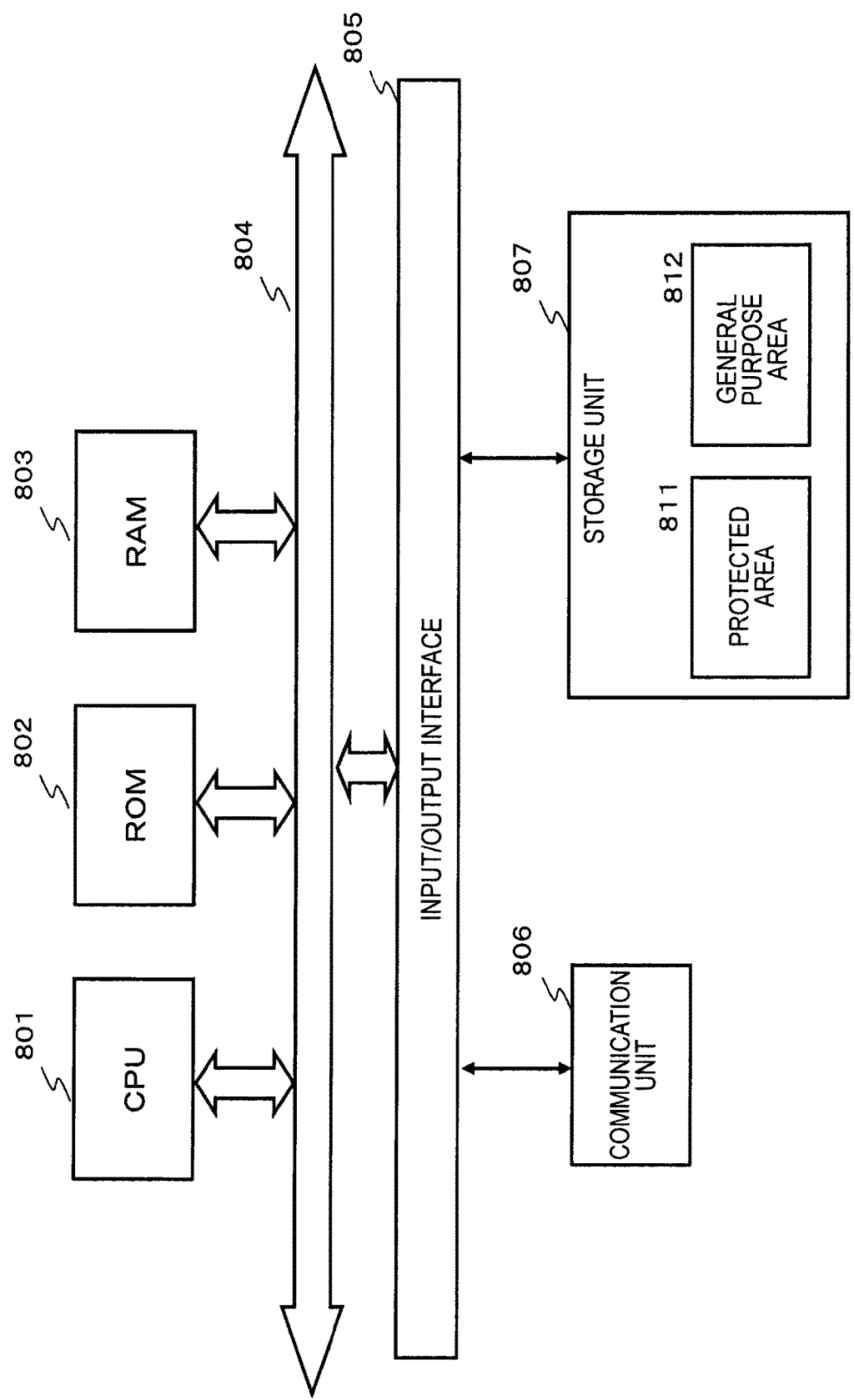

PROTECTION OF CONTENT BASED ON ENCRYPTION

TECHNICAL FIELD

The present disclosure relates to an information processing device, an information processing method, and a program. Especially, the present disclosure relates to an information processing device, an information processing method, and a program that prevent unauthorized use of content in a configuration in which content recorded in a first medium such as a hard disk is recorded in a second medium such as a memory card and is used, for example.

BACKGROUND ART

In recent years, various media such as a digital versatile disc (DVD), a Blu-ray Disc (registered trademark), or a flash memory have been used as information recording medium. In particular, in recent years, the use of memory cards such as a USB memory mounting a large-capacity flash memory thereon has been popularized. Users can record content such as music or movies on various information recording media, load the media into a reproduction device (player), and reproduce the content.

However, copyrights, distribution rights, and the like of most content such as music data or image data are possessed by the authors or sellers thereof. Therefore, when content is provided to users, certain restrictions on use are generally set. That is, use of content is permitted only to users having a legitimate right to use, whereas unregulated use such as copying without consent is not permitted.

For example, the advanced access content system (AACS) is known as a standard for controlling the use of content. The AACS standard defines a use control configuration for content recorded on a Blu-ray Disc (registered trademark), for example. Specifically, the AACS standard specifies an algorithm or the like in which encrypted content is recorded, for example, on the Blu-ray Disc (registered trademark), and which can restrict users capable of acquiring an encryption key for the encrypted content only to legitimate users.

However, the present AACS standard has a specification for a use control configuration of content recorded on discs such as a Blu-ray Disc (registered trademark) but does not have sufficient specification for content recorded on flash memories such as, for example, a memory card. Thus, there is a possibility that copyright protection of content recorded on such a memory card is not sufficient. Therefore, there is a demand for establishing a use control configuration for controlling the use of content using media such as a memory card.

For example, the AACS standard specifies the following specifications as a use control configuration for content recorded on discs such as a Blu-ray Disc (registered trademark):

(a) a specification for the use of content copied from a medium (for example, a ROM disc), on which content is already recorded, to a disc such as a Blu-ray Disc (registered trademark); and (b) a specification for the use of content that is downloaded from a server and recorded on a disc such as a Blu-ray Disc (registered trademark).

For example, the AACS standard specifies control of the use of such content.

The AACS standard specifies managed copy (MC) in which, when content is copied between media in accordance with the specification (a), the copying is permitted only when copy permission information is acquired from a management server.

Moreover, the AACS standard specifies various download forms as a process of downloading content from a server in accordance with the specification (b).

Examples of the download types include electric sell through (EST) that uses user devices such as a PC, and manufacturing on demand (MoD) that uses shared terminals installed in a convenience store or the like.

Even when recording content on a disc through these downloading forms and using the content, it is necessary to perform the processes in accordance with predetermined rules.

Note that these processes are disclosed in Patent Document 1 (Japanese Patent Application Laid-Open No. 2008-98765), for example.

However, as described above, the AACS standard is intended to control the use of content recorded on discs such as a Blu-ray Disc (registered trademark), but does not have a sufficient specification for controlling the use of content recorded on flash memory-type memory cards including USB memories and the like.

For example, content downloaded from a content providing server, broadcast content, and the like are often recorded on a hard disk as a user device such as a PC or a BD recorder. However, when such content is attempted to be used in a mobile device, it is necessary to move the content recorded on the hard disk to a memory card as a small medium, such as a flash memory or a USB hard disk.

Such a process of outputting content is typically called "export".

For example, downloaded content or streaming content once recorded on a hard disk can be copied without limitation if copying (bit-for-bit copy) is performed for another recording medium.

Such unlimited copying is not favorable from the viewpoint of copyright protection.

Some configurations for restricting such unregulated copying have been proposed and used.

For example, there is a configuration in which, when digital data input from an outside is recorded on a hard disk and the like, reproduction of the recorded content is only permitted to a particular device such as one device that executes a data recording process. This configuration is a configuration that connects the use of content to one device, and is so-called "device-bind".

However, such restriction may lack convenience for the user, such as no backup copying being created.

Note that, as a configuration for controlling the transfer of content that has been previously proposed or used, there are following configurations, for example.

In CRPM/SD-Card, which is a standard corresponding to an SD card specified in content protection for recordable media (CPRM) that specifies copyright protection technology related to recording media such as DVDs, a content use control configuration is specified, in which content reproduction is not permitted only on a medium having a particular ID.

Further, in digital living network alliance (DLNA) that specifies a content use configuration in a home network, a configuration is specified, in which leakage to an outside is prevented using a secure transmission path, and streaming distribution of content is performed between devices, which are connected to the network.

In this configuration, it is possible to perform streaming distribution of content recorded in a recorder in the first floor to a PC in the second floor, for example.

Further, the standard of Blu-ray Disc (BD) specifies specification "for permitting recording of content on a BD by recording data (for example, electronic signature, and the like) that associates a medium and content online, and for eliminating unauthorized use of content by having a verification process such as signature verification as a condition of the use of content". This specification is standardized as a prepared video, for example.

In this way, various standards and specifications are merely designed in a range limited to specific use of content. However, when content is used in setting other than the above-described various standardized content use configurations, the use is out of application of the standards, and sufficient copyright protection is not necessarily performed.

CITATION LIST

Patent Document

Patent Document 1: Japanese Patent Application Laid-Open No. 2008-98765

SUMMARY OF THE INVENTION

Problems to be Solved by the Invention

The present disclosure has been made in view of the foregoing, and an objective is to provide an information processing device, an information processing method, and a program that realize a configuration for preventing unauthorized use of content in a configuration in which content requiring use restriction is transferred between media and is used.

A first aspect of the present invention is a content use system including: a content output device configured to output content to be controlled and used; a medium configured to have the content be input from the content output device and to store the content; a reproduction device configured to load the medium and to reproduce the content; and a management server configured to execute control of a recording process of the content to the medium, wherein the content output device outputs encrypted content and an encryption key to be applied to a process of using encrypted content to the medium, the management server generates a media ID verification value that is a verification value based on a media ID that is an identifier of the medium, and transmits the media ID verification value to the medium, the medium stores the encrypted content, the encryption key, and the media ID verification value in a storage unit, and the reproduction device loads the medium, calculates a verification value based on the media ID acquired from the medium, and executes a process of reproducing the encrypted content stored in the medium by data processing to which the encryption key is applied on condition that a matching process between the calculated verification value and the media ID verification value stored in the medium is established.

Further, in an embodiment of the content use system of the present disclosure, the medium includes a protected area in which an access is permitted based on accessibility determination with respect to the storage unit of the medium by verification of a certificate of a device that requests an access, and a general purpose area in which the accessibility determination by the verification of a certificate of a device that requests an access is not necessary, stores the encryption key in the protected area in which access permission is determined based on verification of a certificate of the content output device, and outputs the encryption key recorded in the protected area in which access permission is determined to the reproduction device based on verification of a certificate of the reproduction device, in response to a request of reading of the encryption key by the reproduction device.

Further, in an embodiment of the content use system of the present disclosure, the encrypted content is encrypted content encrypted with a title key, the encryption key is a domain key or a transformation key of a domain key to be applied to an encryption process or an decryption process with respect to the title key, and the content output device outputs, to the medium, the encrypted content, and an encrypted title key encrypted with the domain key.

Further, in an embodiment of the content use system of the present disclosure, the domain key is an encryption key provided by the management server to a domain device permitted to use content.

Further, in an embodiment of the content use system of the present disclosure, the content output device is a domain device holding the domain key and permitted to use content, and the reproduction device a non-domain device not holding the domain key.

Further, a second aspect of the present disclosure is an information processing device including: a data processing unit; and a storage unit, wherein the storage unit is divided into a protected area in which an access is permitted based on accessibility determination by verification of a certificate of a device that requests an access, and a general purpose area in which the accessibility determination by the verification of a certificate of a device that requests an access is not necessary, stores, in the general purpose area, encrypted content, and a media ID verification value generated based on a media ID that is an identifier of the own device, and stores, in the protected area, an encryption key to be applied to a process of using the encrypted content, and the data processing unit verifies a certificate provided from a reproduction device that is to use the encrypted content, and permits reading of the encryption key by the reproduction device in accordance with confirmation of access right with respect to the protected area, and outputs a media ID to the reproduction device, and enables determination of content reproduction availability based on a matching process between a calculated verification value based on a media ID in the reproduction device and a media ID verification value stored in the general purpose area.

Further, in an embodiment of the information processing device of the present disclosure, the data processing unit, in a process of recording the encrypted content in the general purpose area, transmits the media ID to a management server, and receives a media ID verification value generated by the management server and stores the media ID verification value in the general purpose area.

Further, in an embodiment of the information processing device of the present disclosure, the data processing unit stores, in the general purpose area, encrypted content provided from a content output device, and an encrypted title key obtained by encrypting a title key that is an encryption key of the encrypted content, and stores, in the protected area, a domain key that is an encryption key of the encrypted title key, and is provided by the management server to a domain device permitted to use content.

Further, a third aspect of the present disclosure is an information processing device including: a data processing unit configured to read encrypted content stored in a medium including a storage unit and to execute an encryption process and a reproduction process, wherein the medium stores the encrypted content, an encryption key to be applied to a process of using encrypted content, and a media ID verification value that is a verification value based on a media ID that is an identifier of the medium, and the data processing unit calculates a verification value based on the media ID acquired from the medium, and executes a process of reproducing the encrypted content stored in the medium by data processing to which the encryption key is applied on condition that a matching process between the calculated verification value and the media ID verification value stored in the medium is established.

Further, in an embodiment of the information processing device of the present disclosure, the medium includes a protected area in which an access is permitted based on accessibility determination with respect to the storage unit of the medium by verification of a certificate of a device that requests an access, and a general purpose area in which the accessibility determination by the verification of a certificate of a device that requests an access is not necessary, and the data processing unit provides the medium with a certificate that is a certificate of a reproduction device, and in which access permission information with respect to the protected area is recorded.

Further, in an embodiment of the information processing device of the present disclosure, the encrypted content is encrypted content encrypted with a title, and the encryption key is a domain key or a transformation key of a domain key to be applied to an encryption process and a decryption process of the title key.

Further, in an embodiment of the information processing device of the present disclosure, the domain key is an encryption key provided by a management server to a domain device permitted to use content.

Further, a fourth aspect of the present disclosure is an information processing device including: a storage unit configured to store encrypted content and an encryption key to be applied to a process of using the encrypted content; and a data processing unit, wherein the data processing unit has a configuration for outputting the encrypted content and the encryption key to a medium to which content is output, and causing the medium to record the encrypted content and the encryption key, the medium includes a storage unit divided into a protected area in which an access is permitted based on accessibility determination by verification of a certificate of a device that requests an access, and a general purpose area in which the accessibility determination by the verification of a certificate of a device that requests an access is not necessary, and the data processing unit presents a certificate of the own device to the memory card, and writes the encryption key in the protected area in which an access is permitted based on verification of the certificate by the memory card.

Further, a fifth aspect of the present disclosure is an information processing method executed in an information processing device including a data processing unit and a storage unit, the storage unit being divided into a protected area in which an access is permitted based on accessibility determination by verification of a certificate of a device that requests an access, and a general purpose area in which the accessibility determination by the verification of a certificate of a device that requests an access is not necessary, storing, in the general purpose area, encrypted content, and a media ID verification value generated based on a media ID that is an identifier of the own device, and storing, in the protected area, an encryption key to be applied to a process of using the encrypted content, the data processing unit verifying a certificate provided from a reproduction device that is to use the encrypted content, and permitting reading of the encryption key by the reproduction device in accordance with confirmation of access right with respect to the protected area, and outputting a media ID to the reproduction device, and enabling determination of content reproduction availability based on a matching process between a calculated verification value based on a media ID in the reproduction device and a media ID verification value stored in the general purpose area.

Further, a sixth aspect of the present disclosure is an information processing method executed in an information processing device, including: a data processing step, executed by a data processing unit of the information processing device, of reading encrypted content stored in a medium including a storage unit and executing an encryption process and a reproduction process; and storing, by the medium, the encrypted content, an encryption key to be applied to a process of using encrypted content, and a media ID verification value that is a verification value based on a media ID that is an identifier of the medium, wherein the data processing step is a step of calculating a verification value based on the media ID acquired from the medium, and executing a process of reproducing the encrypted content stored in the medium by data processing to which the encryption key is applied on condition that a matching process between the calculated verification value and the media ID verification value stored in the medium is established.

Further, a seventh aspect of the present disclosure is a program for causing an information processing device to execute an information process, including: a data processing step for causing a data processing unit of the information processing device to read encrypted content stored in a medium including a storage unit and to execute an encryption process and a reproduction process; and storing, by the medium, the encrypted content, an encryption key to be applied to a process of using encrypted content, and a media ID verification value that is a verification value based on a media ID that is an identifier of the medium, wherein, in the data processing step, calculating a verification value based on the media ID acquired from the medium, and executing a process of reproducing the encrypted content stored in the medium by data processing to which the encryption key is applied on condition that a matching process between the calculated verification value and the media ID verification value stored in the medium is established.

Solutions to Problems

The program according of the present disclosure is a program that can be provided to an information processing device and a computer system capable of executing various program codes with a recording medium or a communication medium in a computer-readable manner. By providing the program in the computer-readable manner, processes corresponding to the program are realized in the information processing device and the computer system.

Other objectives, features, and advantages of the present disclosure will become apparent from the following detailed description based on specific embodiments of the present disclosure and the accompanying drawings. A system referred to in this specification means a logical set of a plurality of devices and is not limited to a configuration in which the devices are disposed in the same housing.

Effects of the Invention

According to a configuration of one embodiment of the present disclosure, a configuration for outputting content to a medium and using the content stored in the medium is realized under control of the use of content.

To be specific, a content-output-device outputs an encrypted content and an encryption key to be applied to a process of using the encrypted content to a medium, and a management server generates a media ID verification value that is a verification value based on a media ID as an identifier of the medium, and transmits the generated media ID verification value to the medium. The medium stores the encrypted content, the encryption key, and the media ID verification value in a storage unit. A reproduction device loads the medium and calculates a verification value based on the media ID acquired from the medium, and executes a process of reproducing encrypted content stored in the medium by data processing to which the encryption key is applied on condition that a matching process performed between the verification value and the media ID verification value stored in the medium is established.

With these processes, media-bind type content use control is realized.

BRIEF DESCRIPTION OF DRAWINGS

FIG. 8 is a diagram describing an example of data stored in the memory card.

FIG. 9 is a diagram describing a specific configuration example of data generated and provided by a content providing server.

FIG. 14 is a diagram describing a hardware configuration example of the memory card.

MODE FOR CARRYING OUT THE INVENTION

Hereinafter, details of an information processing device, an information processing method, and a program according to of the present disclosure will be described with reference to the drawings. The description will be given in the following order.

1. Outline of Device-Bind Type Content Use Control Configuration
2. Outline of Processes of Providing and Using Content
3. Configuration Example of Memory Card
4. Certificate Containing Access Permission Information with respect to Protected Area
5. Example of Access Processing with respect to Memory Card to Which Certificate of Each Device is Applied
6. Configuration Example of Data Recorded in Memory Card
7. Content Recording Sequence from Device to Memory Card
8. Reproduction Sequence of Content Stored in Memory Card
9. Hardware Configuration Example of Devices
10. Summary of Configuration of Present Disclosure

[1. Outline of Device-Bind Type Content Use Control Configuration]

Before description about a configuration of the present disclosure, an outline of a device-bind type content use control configuration will be described.

Figure 1:
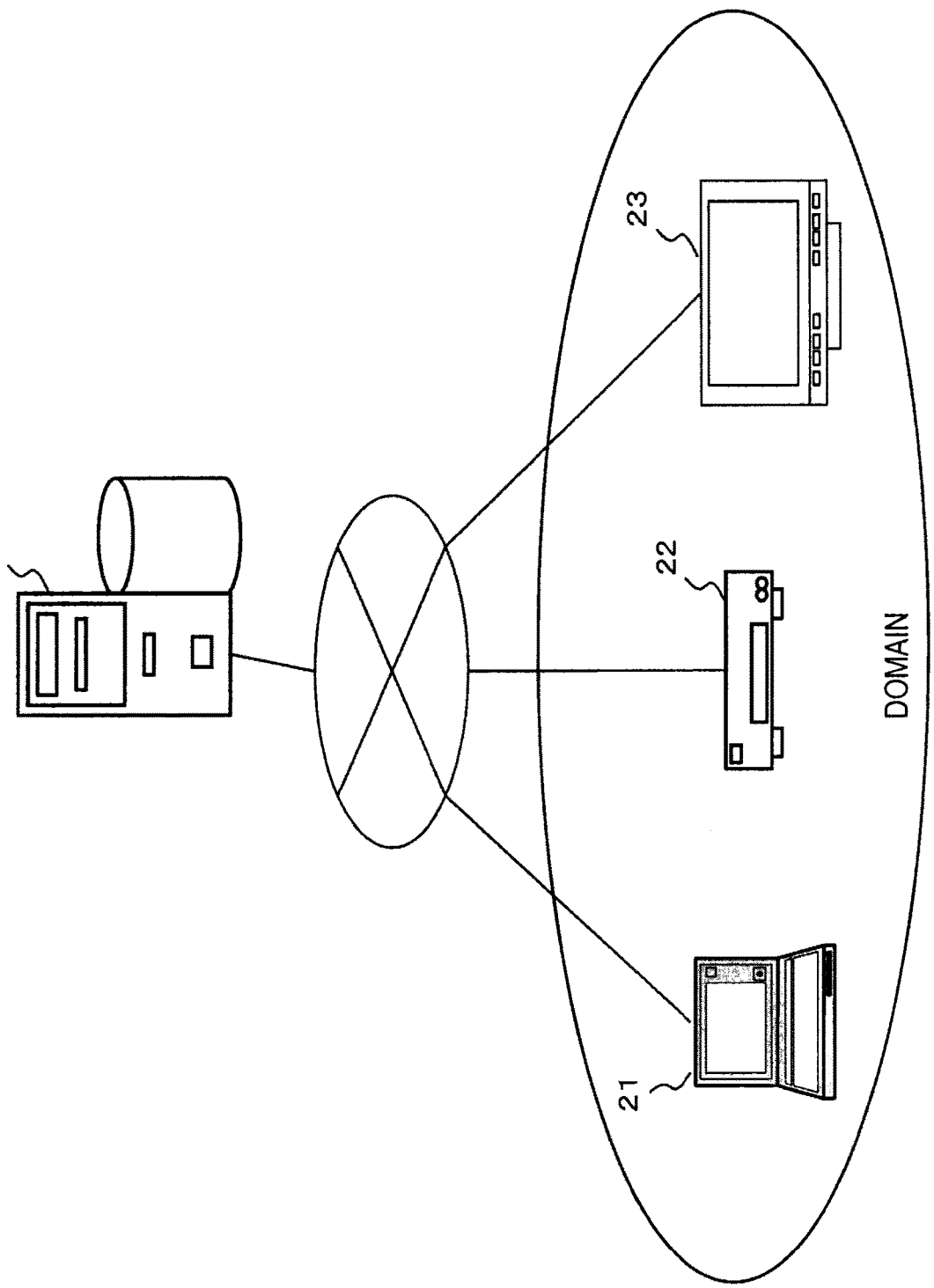
FIG. 1 is a diagram describing an outline of a process of using content according to Marlin that is a content use control standard.

FIG. 1 is a diagram describing a configuration of controlling the use of content per domain according to Marlin Digital Rights Management (Marlin DRM) as an example of a device-bind type content use control configuration. Marlin is a specification for realizing control of the use of digital content specified by Sony Corporation and other manufacturers.

In Marlin, for example, a group of a plurality of reproduction devices used by the users is specified as a domain. Domain devices include various user devices such as a PC 21, a reproduction device 22, and a television 23. These domain devices 21 to 23 provide a management server 11 with registration information such as device IDs, and are registered in the management server 11 as the domain devices. The management server 11 provides the domain devices 21 to 23 with domain keys that are encryption keys. Each of the domain devices 21 to 23 stores the domain key provided from the management server 11 in a storage unit.

Figure 2:
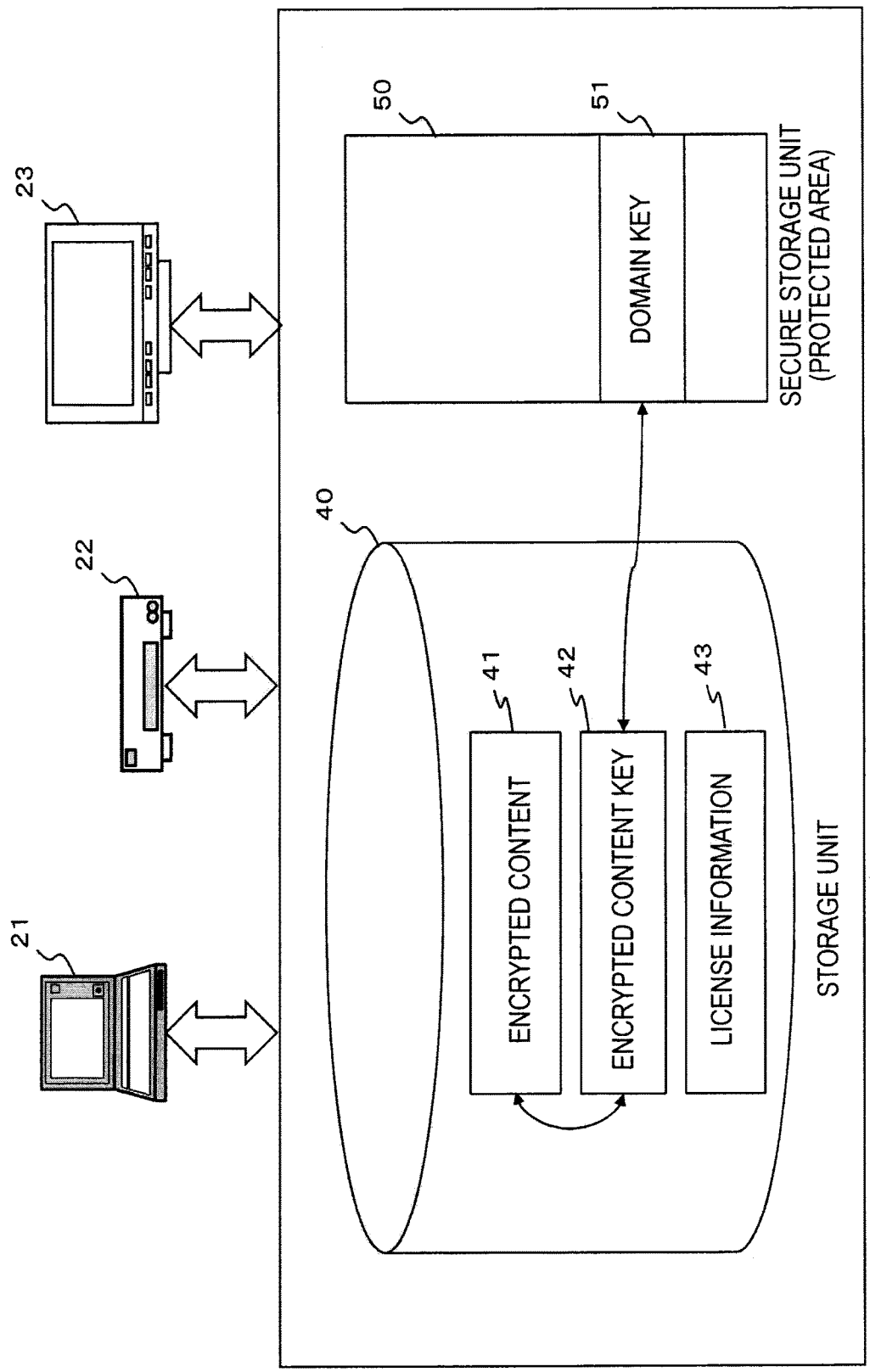
FIG. 2 is a diagram describing an outline of the process of using content according to Marlin that is a content use control standard.

FIG. 2 illustrates an example of data stored in the domain devices 21 to 23.

The domain device records, in a storage unit 40, encrypted content 41 that is encrypted data of content to be reproduced such as movies and music, an encrypted content key 42 in which a content key to be applied to encryption/decryption processes for the encrypted content is encrypted, and license information 43 that records a condition of the use of content, such as information that proves the use of content has been permitted, information about availability of copying of content, information about availability of outputting of content, and the like. These data and information are provided from a content providing server, for example.

Further, the above-described domain key 51 is stored in a secure storage unit 50 that is difficult to be accessed from an outside.

The domain key 51 is a key to be applied to the encryption/decryption processes for the encrypted content key 42.

When content reproduction is performed in the domain devices 21 to 23, the following processes are executed:

(1) acquiring a content key by decrypting the encrypted content key 42 using the domain key 51;

(2) acquiring content by decrypting the encrypted content 41 using the acquired content key; and (3) reproducing and using the acquired content within a range permitted in the license information 43.

According to such a sequence, the use of content in the domain devices becomes possible.

In this way, the content can be used only in particular devices registered as domain devices. That is, in Marlin DRM, the device-bind type content use control is realized.

However, in such a device-bind type content use control configuration, the content cannot be used at all in devices other than the registered domain devices.

In recent years, the use of memory cards provided with large-capacity small memory such as a flash memory or small hard disk has become popular.

Figure 3:
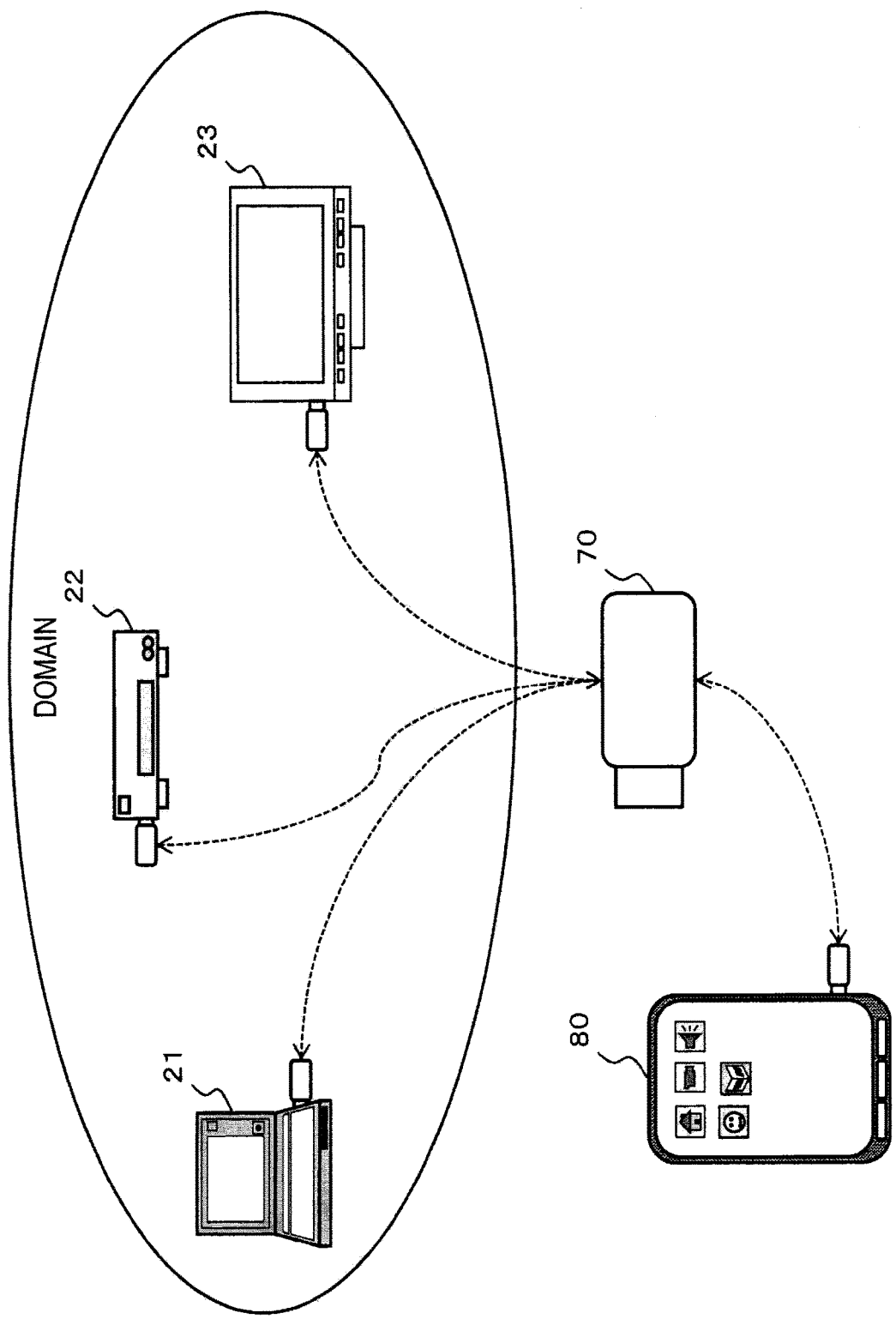
FIG. 3 is a diagram describing issues of the process of using content according to Marlin that is a content use control standard.

For example, as illustrated in FIG. 3, when it is desired to move or copy the content from the domain devices 121 to 123 to a memory card 70, to load the memory card 70 into a small device 80 other than the domain devices to use the memory card 70, the above-described device-bind type content use control configuration cannot deal with such use. That is, there is a problem such that the content cannot be used.

To enable the use of content in the small device 80, it is necessary for the user to execute predetermined procedures to register the small device 80 in the management server 11 as a domain device, to obtain an additional new domain key from the management server 11, and to store the domain key in the small device 80.

In this way, to use the content in a new reproduction device in the device-bind type content use control configuration, a process of registering the new reproduction device in the management server, and storing a domain key is newly in the new reproduction device is necessary.

Hereinafter, a configuration will be described, in which content is moved or copied to a memory card and the like without such registration of new device, and the use of content is made available and unauthorized use of content is prevented in a device to which the memory card is loaded.

[2. Outline of Processes of Providing and Using Content]

First, the outline of processes of providing and using content will be described with reference to FIG. 4 and subsequent drawings.

Figure 4:
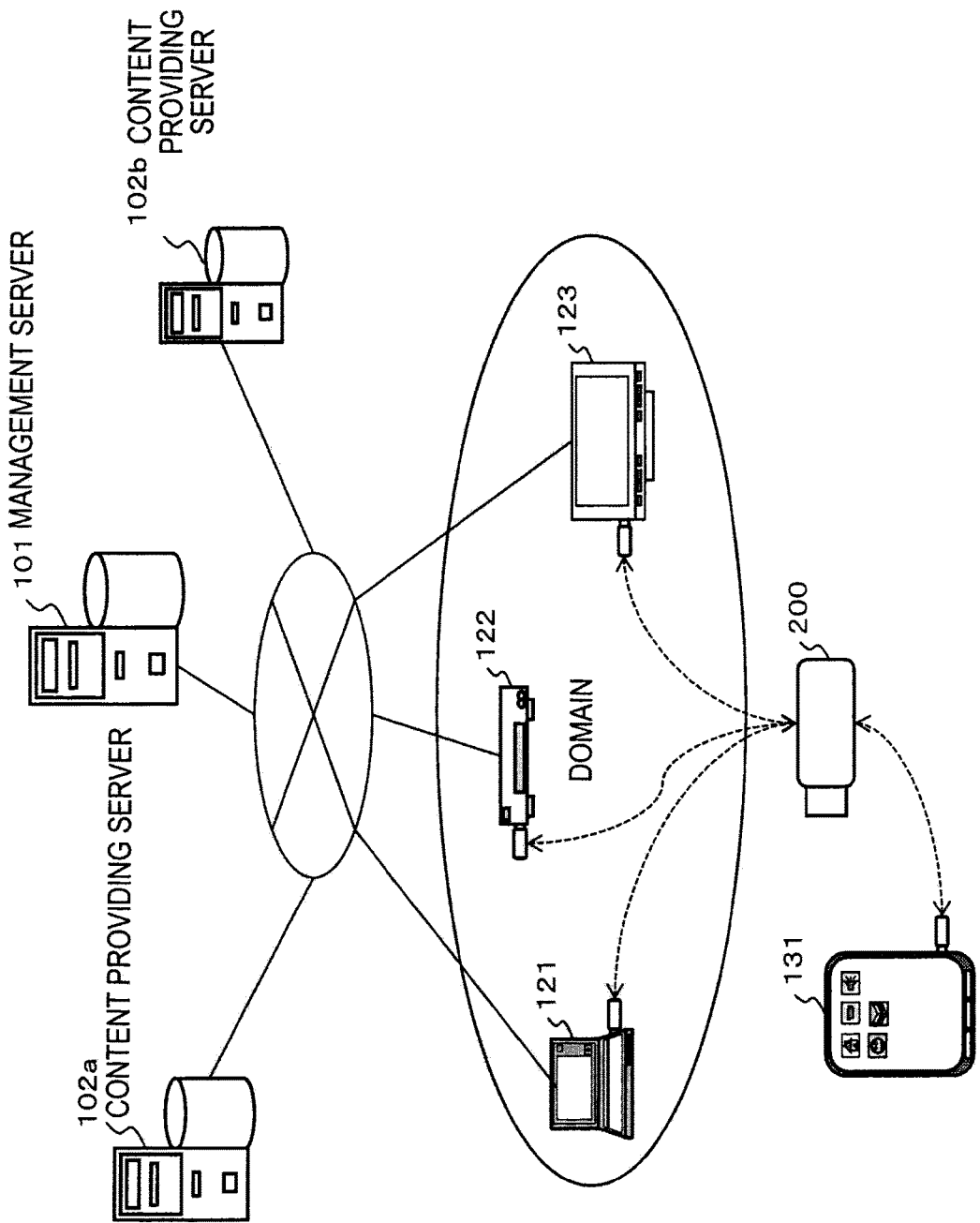
FIG. 4 is a diagram describing an example of a content use configuration assumed in a configuration of the present disclosure.

FIG. 4 illustrates a PC 121, a reproduction device 122, and a television 123 which are content providing devices as user devices and are domain devices registered to the management server described above.

These domain devices are devices registered as content use devices in a management server 101, and hold domain keys as described with reference to FIG. 2.

The management server 101 holds device information of the domain devices 121 to 123 as management information, and provides these devices with the domain keys.

Further, content providing servers 102a and 102b provide the domain devices 121 to 123 with encrypted content.

The user devices include a reproduction device 131 other than the domain devices 121 to 123 registered in the management server 101. The reproduction device 131 is a device that is not registered as a domain device (non-domain device).

The user loads a memory card 200 including a storage unit such as a flash memory or a small hard disk to any of the domain devices 121 to 123, for example, and moves or copies various types of information necessary for the encrypted content and content reproduction from the domain device to the memory card.

This memory card 200 is loaded to the reproducing device 131 as a non-domain device, and the reproduction of the content and the use of the content are performed in the reproduction device 131.

Such use of content is realized as a configuration for preventing leakage of the content and unauthorized use.

[3. Configuration Example of Memory Card]

Next, a specific configuration example and a use example of the memory card 200 illustrated FIG. 4 will be described.

Figure 5:
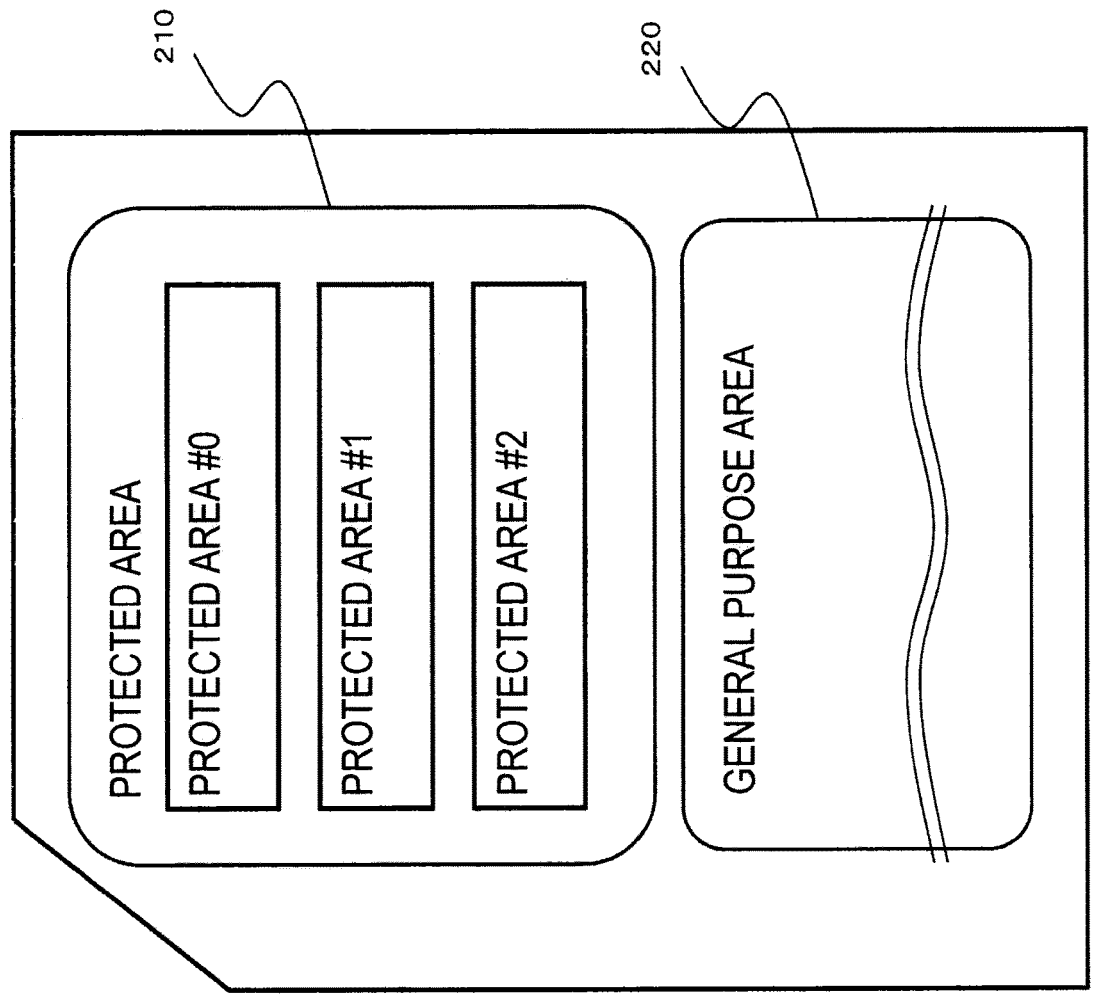
FIG. 5 is a diagram describing a specific configuration example of a storage area of a memory card.

FIG. 5 is a diagram illustrating a specific configuration example of a memory card such as a flash memory used as a recording medium of content.

As illustrated in FIG. 5, the storage area of the memory card 200 includes two areas:

(a) protected area 210; and
(b) general purpose area 220,

The (b) general purpose area 220 is an area to which a recording device and a reproduction device used by a user are freely accessible and on which content, general content management data, and the like are recorded. That is, users can freely write or read data to/from the area.

On the other hand, the (a) protected area 210 is an area in which a free access is not permitted.

For example, when a recording device or a reproduction device used by a user or a server or the like connected through a network performs writing or reading of data, the data processing unit of the memory card 200 executes an access permission determination process according to a program stored in the memory card 200 in advance. By the determination process, the availability of reading or writing is determined in accordance with each device that requests an access.

The memory card 200 includes a data processing unit that executes the program stored in advance and an authentication process, and the memory card 200 performs a process of authenticating a device that attempts writing or reading of data to/from the memory card 200.

In the authentication process, a device certificate (for example, a host certificate) such as a public key certificate is received from the other device, namely a device that has requested an access, and access permission determination with respect to the divided areas of the protected area 210 is performed using information described in the certificate. This determination process is performed for each of divided areas (areas #0, #1, #2, and the like illustrated in the drawing) in the protected area 210 illustrated in FIG. 5, and only a permitted process (a process of reading/writing of data and the like) executed in a permitted divided area is set as a permitted process with respect to the access requesting device.

The medium read/write restriction information with respect to a medium (PAD Read/PAD Write) is set, for example, for each device that attempts an access, such as a server or a recording and reproduction device (host). This information is recorded in a server certificate or a host certificate corresponding to each device.

The memory card 200 verifies data recorded in the server certificate or the host certificate according to a predetermined program stored in the memory card 200 in advance and permits an access only to an area to which access permission is given.

[4. Certificate Containing Access Permission Information with respect to Protected Area]

Next, a configuration example of a certificate that needs to be presented to a memory card upon accessing the protected area 210 of the memory card 200 described above will be described with reference to FIG. 6.

As described above, the memory card 200 performs a process of authenticating a device that attempts reading or writing of data in/from the memory card 200. In this authentication process, a device certificate (for example, a host certificate) such as a public key certificate is received from the other device, namely, a device that has requested an access. Using the information described in the certificate, whether to permit an access to each divided area of the protected area 210 is determined.

A configuration example of a host certificate to be provided to the user devices (host device) such as the domain devices 121 to 123 and the reproduction device 131 illustrated in FIG. 4, and stored in these devices will be described as an example of the device certificate used in the authentication process with reference to FIG. 6.

The host certificate is provided by an authentication station, which is a subject issuing a public key certificate to each user device (host device), for example. For example, the host certificate is a certificate of the user device, which is issued to the user device (host device) permitted by the authentication station to perform a process of using content. Further, it is a certificate in which the public key and the like are stored. With respect to the host certificate, a signature is set with an authentication station secret key, and is configured as falsification-prevented data.

Note that the server that accesses the protected area of the memory card 200 is also provided with a server certificate having a similar configuration to the host certificate and on which a server public key and access permission information of a memory card is recorded.

Figure 6:
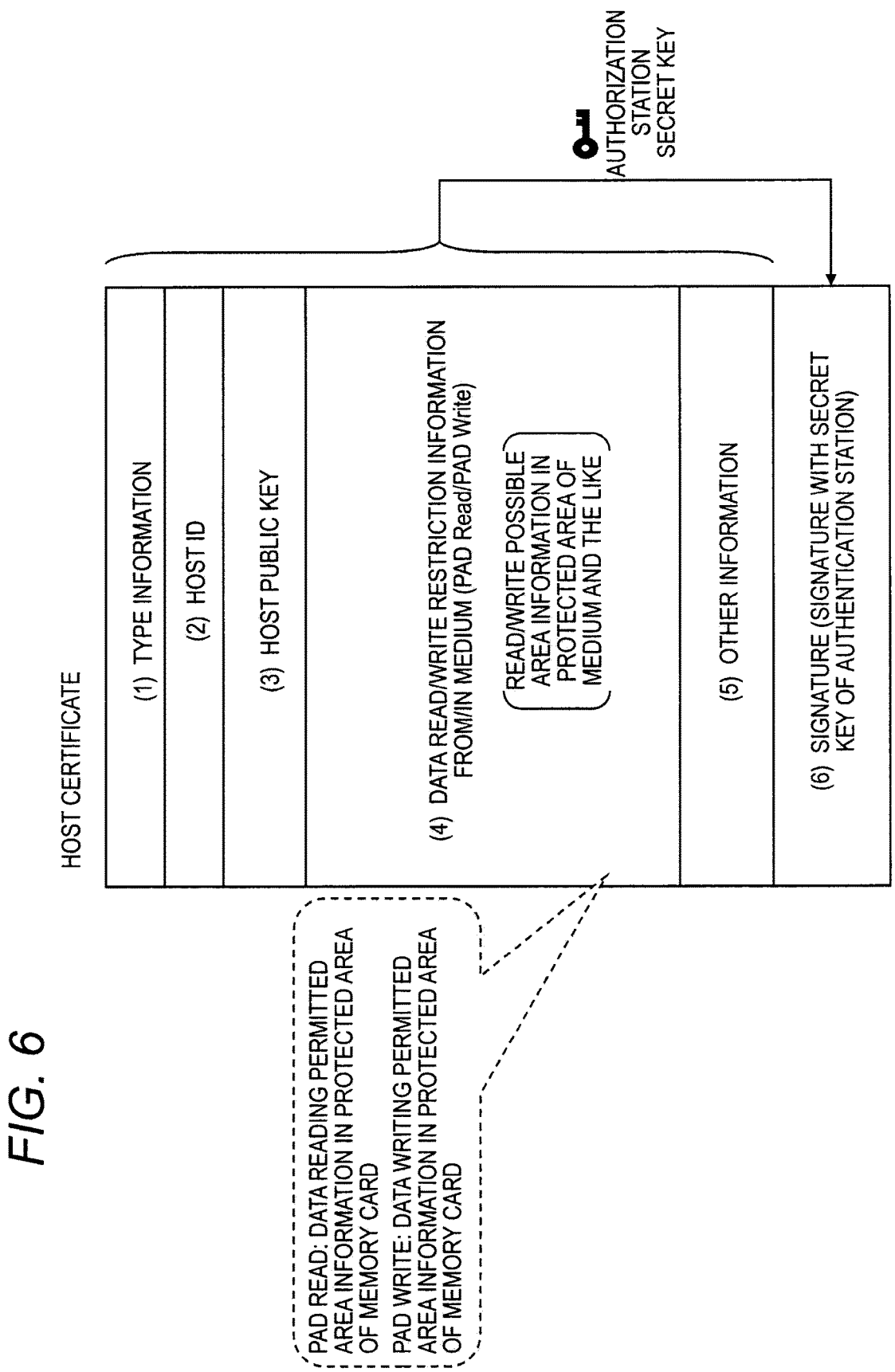
FIG. 6 is a diagram describing a host certificate.

FIG. 6 illustrates a specific example of the host certificate provided by the authentication station to the host devices (user devices).

As illustrated in FIG. 6, the host certificate includes the following data:

(1) type information;
(2) host ID (user device ID);
(3) host public key;
(4) read/write restriction information from/in medium (PAD read/PAD write);
(5) other information; and
(6) signature.

The respective data (1) to (6) will be described below.

(1) Type Information

The type information is information indicating the type of certificate and the type of user device. For example, data that indicates the certificate is a host certificate and information that indicates the type of device, for example, indicates the device is a PC, a music reproduction player, or the like are recorded as the type information.

(2) Host ID

The host ID is an area in which a device ID as device identification information is recorded.

(3) Host Public Key

The host public key is a public key of a host device. The host public key constitutes a key pair corresponding to a public key encryption method together with a secret key.

(4) Read/Write Restriction Information from/in Medium (PAD Read/PAD Write)

As the read/write restriction information from/in a medium (PAD read/PAD write), information about a divided area(s) to which reading or writing of data from/in the protected area (PDA) is permitted is recorded. The divided area(s) is in the protected area set in the storage area of the memory card 200 illustrated in FIGS. 4 and 5, in which the content is recorded.

(5) Other Information and (6) Signature

In the host certificate, various types of information are recorded in addition to (1) to (4) above. That is, signature data with respect to the information (1) to (5) is also recorded.

The signature is executed with a secret key of the authentication station. To retrieve and use the information recorded in the host certificate, for example, the host public key, a signature verification process to which the public key of the authentication station is applied is first executed to confirm the host certificate is not falsified. Then, the use of data such as the host public key stored in the certificate is permitted on condition that this confirmation has been performed.

Note that FIG. 6 illustrates a host certificate in which the access permission information of the user device (host device) with respect to the protected area of the memory card is recorded. However, for example, to the server that needs an access to the protected area, such as a content providing server that provides the memory card with content, a certificate (server certificate (server public key certificate)) in which access permission information with respect to the protected area of the memory card is recorded is provided, similarly to the host certificate illustrated in FIG. 6.

[5. Example of Access Processing with Respect to Memory Card to which Certificate of Each Device is Applied]

As described with reference to FIG. 6, when accessing the protected area 210 of the memory card 200, it is necessary to present the certificate as illustrated in FIG. 5 to the memory card.

The memory card confirms the certificate illustrated in FIG. 6 to determine availability of an access to the protected area 210 of the memory card 200 illustrated in FIG. 5.

The host device holds the host certificate described with reference to FIG. 6, for example, and the server, which provides content and the like, holds a certificate corresponding to the server (server certificate).

When accessing the protected area of the memory card, each device needs to provide the certificate held by the device to the memory card, and needs to be subjected to determination about availability of an access based on the verification by a memory card side.

A setting example of access restriction when a device that requests an access to the memory card is the host device such as the recording and reproduction device will be described with reference to FIG. 7

Figure 7:
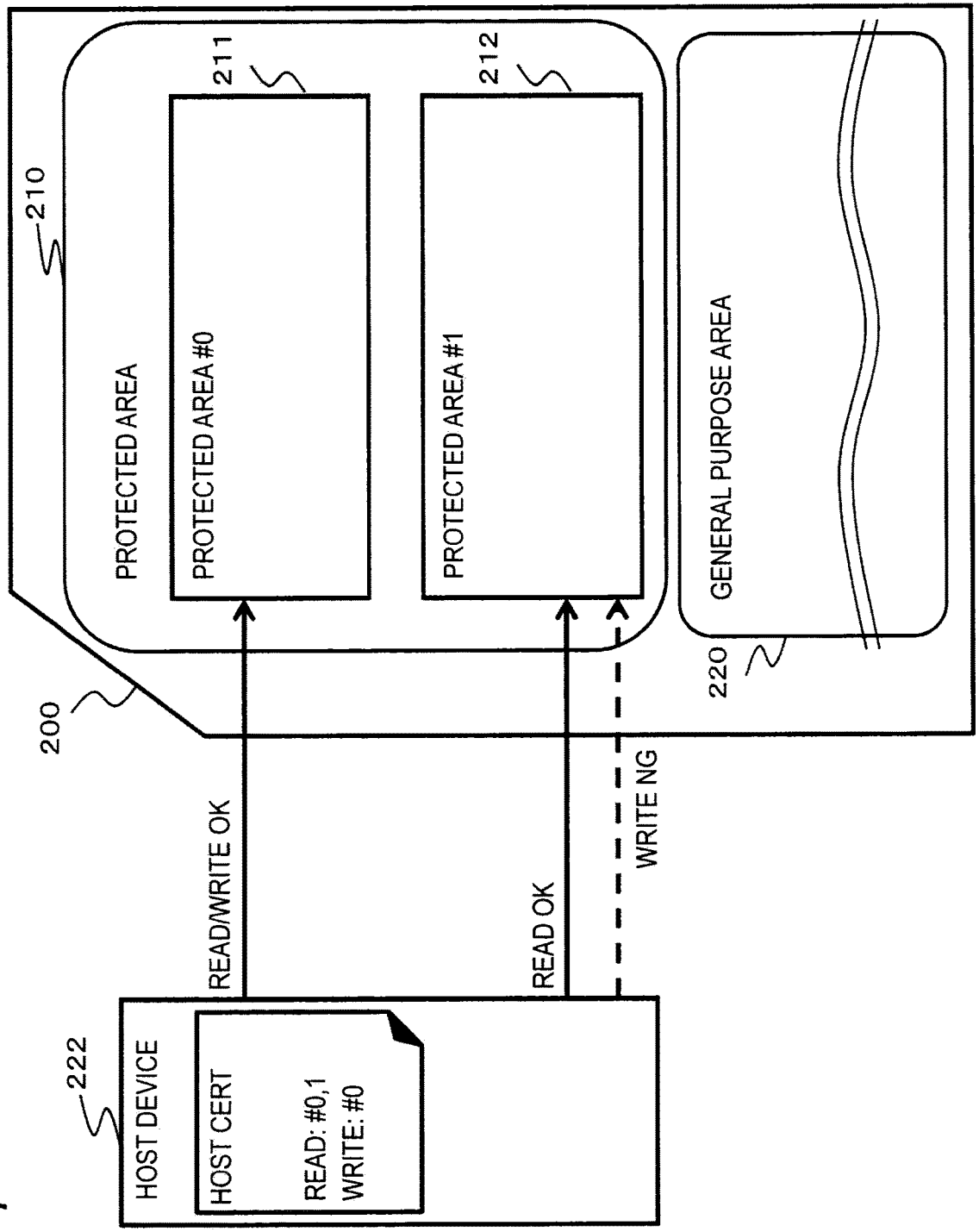
FIG. 7 is a diagram describing an example of a specific configuration example of the storage area of the memory card and an example of an access control process.

FIG. 7 illustrates, from the left, a host device 222 that is a device that requests an access to the memory card and the memory card 200.

The host device 222 is, for example, a user device such as the domain devices 121 to 123 and the reproduction device 131 illustrated in FIG. 4, and is a device that executes a process of outputting content to the memory card 200, and reproducing content recorded in the memory card 200.

For example, when outputting the encrypted content stored in the own storage units to the memory card 200, the domain devices 121 to 123 execute a process of writing the domain keys stored in the own devices in the protected area 210 of the memory card 200.

In addition, when performing reproduction using the encrypted content recorded in the memory card 200, the reproduction device 131 executes a process of obtaining the domain key written in the protected area 210 of the memory card 200.

The domain devices 121 to 123, and the reproduction device 131 as the non-domain device need an access to the protected area 210 of the memory card 200 in the above processes.

The memory card 200 includes the protected area 210 and the general purpose area 220, and the encrypted content and the like are recorded in the general purpose area 220.

The domain key that is a key necessary for content reproduction is recorded in the protected area 210.

As described with reference to FIG. 5, the protected area 210 is divided into a plurality of areas.

In the example illustrated in FIG. 7, the protected area 210 includes the following two divided areas:

a divided area #0 (protected area #0) 211; and a divided area #1 (protected area #1) 212.

As a setting form of these divided areas, various settings are possible.

In the example illustrated in FIG. 7, the host certificate held by the host device 222 is a certificate in which the following setting is made:

both of writing and reading of data are permitted with respect to the divided area #0 (protected area #0); and only the reading process is permitted with respect to the divided area #1 (protected area #1).

In the host certificate illustrated in FIG. 7, writing permission is not set to the divided area #1 (protected area #1).

For example, a certificate in which such access permission information is recorded is provided to the user device.

A device that attempts an access to the protected area 210 of the memory card 200 outputs, to the memory card, the certificate in which the access permission information is recorded, and the access availability is determined based on the verification process with respect to the certificate in the data processing unit in the memory card. The device accesses the protected area 210 of the memory card 200 according to determination information.

In this way, in the protected area of the memory card, writing/reading of data being permitted or not permitted is set as the access control information for each device that requests an access and for each divided area (#0, #1, #2, . . . ).

The access control information is recorded in the certificate (the server certificate, the host certificate, and the like) of each device that requests an access, and the memory card first performs signature verification about the certificate received from the access requesting device and confirms the validity, and then reads out the access control information, that is, the following information written in the certificate:

reading permitted area information (PAD Read); and writing permitted area information (PAD Write).

The memory card permits and executes a process permitted to the access requesting device based on the information.

Note that the host devices include various types of device including a CE device such as a recorder and a player, and a PC.

The device certificate is a certificated individually held by these devices, and may be differently set according to the types of device.

In addition, the data processing unit of the memory card may determine permission of an access to each divided area of the protected area based on not only the following information recorded in the device certificate:

reading permitted area information (PAD Read); and writing permitted area information (PAD Write), but also the type information (type) included in the certificate described with reference to FIG. 6.

[6. Configuration Example of Data Recorded in Memory Card]

Next, for example, when content recorded in any of the domain deices 121 to 123 illustrated in FIG. 4 is moved or copied to the memory card 200, and the content stored in the memory card 200 is used in the reproduction device 131 as a non-domain device, an example of the data to be recorded in the memory card 200 by the domain devices 121 to 123 will be described with reference to FIG. 8.

FIG. 8 illustrates an example of data recorded in the memory card 200.

The memory card 200 includes the protected area 210 to which an access is permitted according to the access permission information recorded in the certificate (see FIG. 6) held by each access device, and the general purpose area 220 to which an access is permitted without being based on the access permission information recorded in the certificate.

As illustrated in FIG. 8, a domain key 381 is recorded in the protected area 210.

This domain key 381 is a key received from the management server 101 on condition that the domain devices 121 to 123 illustrated in FIG. 4 has registered the domain devices to the management server 101. This domain key 381 is a key applied to the encryption/decryption processes of a title key to be used as an encrypting/decrypting key of the encrypted content.

Data including the encrypted content other than the domain key 381 are recorded in the general purpose area 220.

FIG. 8 illustrates an example in which two encrypted content files are recorded, namely, an encrypted content file #1 310 and an encrypted content file #2 320 that are encrypted data of content to be reproduced such as movie data and music data, and are data files having the MPEG4 (MP4) format as a compression format.

ID information as content identifiers are set to these encrypted content files, and the ID information are recorded in security boxes set in the respective content files. The ID information correspond to ID information as indexes set to storage areas, such as the key information corresponding to the respective content files.

For example, the reproduction device that loads the memory card 200 and reproduces content stored in the memory card 200 can acquire, upon selecting content to be reproduced, the management information corresponding to the selected content according to an ID acquired by acquiring the ID information from the security box in the selected content file.

Note that these pieces of ID information are set by the data processing unit in the memory card 200 as indexes in the recording area of the management information in moving or copying content from the domain devices 121 to 123 illustrated in FIG. 4.

In the example of FIG. 8, a content identifier (ID1) is recorded in a security box 311 of the encrypted content file 310, and management information 330 corresponding to the content identifier (ID1) is recorded in a recording area that can be identified with the index (ID1).

Further, a content identifier (ID2) is recorded in a security box 321 of the encrypted content file 320, and management information 340 corresponding to the content identifier (ID2) is recorded in a recording area that can be identified with the index (ID2).

The management information 330 is recorded in the recording area that can be identified with the index (ID1) corresponding to the encrypted content file #1 310, and information to be used in the process of reproducing the encrypted content file #1 310 is recorded therein. To be specific, as illustrated in FIG. 8, the following pieces of information are recorded as the management information 330 corresponding to the encrypted content file 310:

(a) token 331;
(b) use control information (usage file) 332;
(c) media ID verification value (MAC of media ID) 333; and
(d) encrypted title key 334.

Similarly, the management information 340 to be used in the process of reproducing the encrypted content file #2 320 is recorded in the recording area that can be identified with the index (ID2). To be specific, as illustrated in FIG. 8, the following pieces of information are recorded as the management information 340 corresponding to the encrypted content file 310:

(a) token 341;
(b) use control information (usage file) 342;
(c) media ID verification value (MAC of media ID) 343; and
(d) encrypted title key 344.

Among these data (a) to (d),
the (a) tokens 331 and 341,
the (b) use control information (usage files) 332 and 342, and
the (d) encrypted title keys 334 and 344 are data held by the domain devices 121 to 123 illustrated in FIG. 4 together with the encrypted content.

That is the data received from the content providing sever 102 together with the content when the domain devices 121 to 123 illustrated in FIG. 4 acquire the content from the content providing server 102.

Meanwhile, among the data (a) to (d),
the (c) media ID verification values (MAC of media IDs) 333 and 343 are not data held by the domain devices 121 to 123. These media ID verification value (MAC of media IDs) 333 and 343 are information acquired from the management server 101 according to the sequence set in advance when the content is recorded in the memory card 200 as a medium.

The media ID verification values (MAC of media IDs) 333 and 343 are used as data for connecting the medium (memory card 200) and the content recorded in the medium (memory card 200), that is, used as data for causing the content to be media-bound.

A media certificate 360 is further recorded in the general purpose area 220. This media certificate is a public key certificate in which a media ID of the medium (memory card 200) and a media public key are stored. For example, the media certificate is a certificate provided from the authentication station, and has similar data configuration to the host certificate described with reference to FIG. 6. However, the media certificate does not hold recorded data about the access permission information with respect to the protected area.

The media certificate is used in the process of authenticating the device that loads the medium (memory card 200).

The tokens 331 and 341 included in the management information are data in which management information related to corresponding content is recorded therein, and are data generated by the content providing server and are provided to the devices (domain devices 121 to 123) along with the content.

Specific configuration data of the token will be described with reference to FIG. 9.

As illustrated in FIG. 9, the token includes the following data:

(1) volume ID (PV Volume ID);
(2) content ID;
(3) content hash table digest(s);
(4) use control information hash value (usage rule hash);
(5) time stamp;
(6) other information; and
(7) signature.

Hereinafter, the above-described data will be described.

(1) Volume ID (PV Volume ID)

The volume ID (PV Volume ID) is an identifier (ID) corresponding to content in a predetermined unit (for example, in a unit of title). This ID is data which is often referenced by a BD-J/API, BD+API, or the like which is a Java (registered trademark) application that is likely to be used when content is reproduced, for example.

(2) Content ID

Although the content ID is an identifier for identifying content, the content ID recorded in the token is set as data including a server ID of a server that provides content or content management data (including a token).

That is, Content ID=Server ID+Unique Content ID.

As described above, the content ID is recorded as data including the server ID.

The server ID is an ID that is set by the authentication station to each content providing server. The server ID is same as the server ID recorded in the server certificate including similar data to the host certificate described with reference to FIG. 6.

The unique content ID is an identifier (ID) corresponding to content, which is uniquely set by the content providing server.

The content ID recorded in the token includes a combination of the server ID set by the authentication station and the unique content ID set by the content providing server.

The bit numbers of the content ID, the server ID, and the unique content ID are determined in advance. The reproduction device that reproduces content can acquire the server ID by acquiring predetermined upper bits from the content ID recorded in the token, and can acquire the unique content ID by acquiring predetermined lower bits from the content ID.

(3) Content Hash Table Digest(s)

The content hash table digest (s) is data in which the hash value of content is stored in the memory card. The data is used for verifying falsification of content.

The reproduction device that reproduces content calculates the hash value of content to be reproduced recorded in the memory card, and compares the calculated hash value and the value recorded in the content hash table digest(s) recorded in the token. If the calculated data is matched with the registered data, it is determined that the content is not falsified, and the content can be reproduced. If they are not matched, it is determined that there is a possibility that the content is falsified, and reproduction thereof is inhibited.

(4) Use Control Information Hash Value (Usage Rule Hash)

The use control information hash (usage rule hash) is a hash value of the use control information (usage file) in which a server is recorded in the memory card as management data.

The use control information is data in which permission information of a content use form is recorded. Examples of the information include whether copying of content is permitted, the allowable number of copying, and the availability of outputting content to other devices. The use control information is recorded in the memory card together with content.

The use control information hash value is the hash value used as data for verifying falsification of the use control information.

The reproduction device that reproduces content calculates the hash value of the use control information corresponding to content to be reproduced recorded in the memory card, and compares the calculated hash value and the recorded value of the use control information hash value (usage rule hash) recorded in the token. If the calculated data and the registered value are matched, it is determined that the use control information is not falsified, and the content can be used in accordance with the use control information. If they are not matched, it is determined that there is a possibility that the use control information is falsified, and the use of content such as reproduction is inhibited.

(5) Time Stamp

The time stamp is information indicating the date and time at which the token is created, for example, the date and time at which the (7) signature in FIG. 9 is created.

As illustrated in FIG. 9, "(6) Other Information" is also recorded in the token in addition to the above-described data. Further, the (7) signature generated with the secret key of the server is recorded for each of the data (1) to (6). With this signature, an anti-falsification system of the token is realized.

In the case of using the token, signature verification is first executed, and the validity of the token is confirmed before using the token. Note that the signature verification is executed using the public key of the server. The public key of the server can be acquired from the server certificate.

[7. Content Recording Sequence from Device to Memory Card]

Next, a content recording sequence from a device such as the domain devices 121 to 123 illustrated in FIG. 4 to the memory card 200 will be described with reference to the sequence diagram of FIG. 10.

Figure 10:
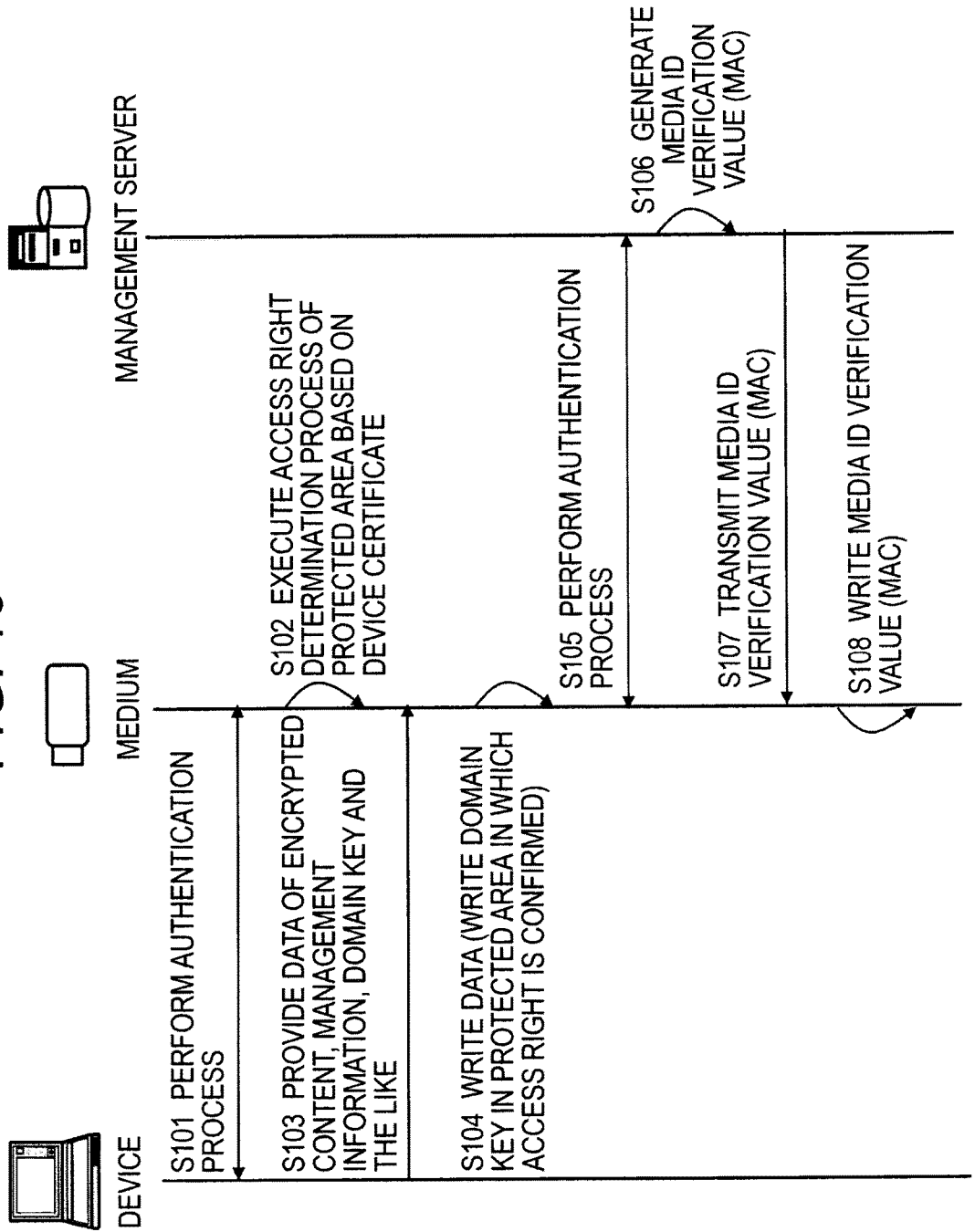
FIG. 10 is a diagram describing a process sequence when content is recorded in the memory card.

FIG. 10 illustrates, from the left, a device that holds content (for example the domain devices 121 to 123 illustrated in FIG. 4), a memory card in which content is recorded, and a management server.

The device is any of the domain devices 121 to 123 illustrated in FIG. 4, for example, and is a device that receives the domain key from the management server 101. Further, the device holds encrypted content and the management information thereof from the content providing server 102.

The management information includes the following information described with reference to FIG. 8:

(a) token;

(b) use control information (usage file); and (d) encrypted title key.

Each process will be described with reference to the sequence diagram of FIG. 10.

First, in step S101, the device (the domain devices 121 to 123 illustrated in FIG. 4) loads the memory card, and a cross-authentication process is performed between the device and the memory card. For example, a cross-authentication process including exchange of mutual public key certificates is performed according to a public key encryption method.

Both of the device and the memory card hold a certificate in which the public key issued by the authentication station is stored, and a secret key. The certificate held by the device is the host certificate described with reference to FIG. 6, and access right information related to the protected area of the memory card is recorded in the certificate in addition to the public key.

Note that the memory card stores programs for performing the cross-authentication process and for determining the accessibility to the protected area described with reference to FIGS. 5 and 7, and includes a data processing unit that executes these programs.

When the cross-authentication between the device and the memory card is established, and the mutual validity is confirmed, step S102 and subsequent processes are executed. For example, a process of providing various data including the encrypted content from the device to the memory card in step S103 is performed. If the cross-authentication is not established, step S102 and the subsequent processes are not executed. That is, the process of providing data from the device to the memory card in step S103 is not performed.

If the cross-authentication between the device and the memory card is established, and the mutual validity is confirmed, in step S102, the data processing unit of the memory card refers to the public key certificate (host certificate illustrated in FIG. 6) provided by the device to the memory card in the authentication process, and confirms the access right with respect to the protected area of the memory card.

As described with reference to FIGS. 5 to 7, the protected area of the memory card is divided into a plurality of divided areas, and the access right information (read/write permission information) for each divided area is recorded in the host certificate provided by the device to the memory card.

The data processing unit of the memory card refers to the certificate (the host certificate illustrated in FIG. 6) received from the device, and confirms the access right with respect to each divided area of the protected area of the memory card.

Note that, in recording content in the memory card, it is necessary to write the domain key in the protected area of the memory card. Therefore, the data processing unit of the memory card confirms whether the write permission information with respect to one or more divided areas of the protected area of the memory card is recorded in the certificate (the host certificate illustrated in FIG. 6) received from the device.

When there is no write permission information with respect to the divided area, writing of the domain key to the protected area of the memory card by the device is not permitted. In this case, the process of providing content to the memory card in step S103 and the subsequent processes are discontinued.

In a case where the write permission information with respect to one or more divided areas of the protected area of the memory card is recorded in the certificate (the host certificate illustrated in FIG. 6) provided from the device to the memory card, the domain key provided by the device can be recorded in the protected area, and step S103 and the subsequence processes are executed only in this case.

In step S103, the device transmits the following data to the memory card:

(1) encrypted content;

(2) management information (a token, use control information, and an encrypted title key); and (3) domain key.

Among these pieces of information, the (1) encrypted content, and the (2) management information (a token, use control information, and an encrypted title key) are data received by the device from the content providing server in the content acquiring process.

The (3) domain key is key information received by the device from the management server.

In step S104, the memory card writes the data received from the device in the storage area of the memory card.

Among the received data of (1) to (3), the (1) encrypted content, and the (2) management information (a token, use control information, and an encrypted title key) are written in the general purpose area of the memory card.

Further, among the received data of the (1) to (3), the (3) domain key is recorded in the protected area of the memory card. Note that the domain key is written in the divided area to which the write process is permitted in the process of confirming the access right based on the host certificate of the device in step S102.

Next, the memory card starts a process of a cross-authentication with the management server. Note that the communication between the memory card and the server is executed through a communication unit of the device that has loaded the memory card.

The cross-authentication process between the management server and the memory card includes exchange of the public key certificates of both sides according to the public key encryption method, for example. The management server also holds the server certificate in which a public key issued by the authentication station is stored, and a secret key. The memory card receives the pair of the public key certificate and the secret key from the authentication station in advance, and stores the pair in the own storage unit.

When the cross-authentication between the management server and the memory card is established, and the mutual validity is confirmed, in step S106, the server acquires the media ID that is identification information of the memory card recorded in the certificate of the memory card, and generates a message authentication code (MAC) as a verification value of the media ID.

In step S107, the management server transmits the generated MAC as the verification value of the media ID to the memory card.

In step S108, the memory card writes the received media ID verification value (MAC) received from the management server in the general purpose area of the memory card.

With the above processes, the data described with reference to FIG. 8, that is, the following data are stored in the memory card:

the encrypted content file 310;

the management information 330; and the domain key 381.

Note that, as described with reference to FIG. 8, the content and the management information corresponding to the content are recorded in association with each other with the identification information (ID1, ID2, ID3, and the like).

In recording new content, the memory card acquires the identifier (ID) recorded in the security box included in the content file, sets a storage area by setting the ID as an index in the general purpose area of the memory card, and records the management information corresponding to the content file in the set storage area.

Further, it may be configured such that the device records a device identifier in the use control information (usage file) included in the management information to be provided to the memory card, and provides the management information to the memory card.

That is, information indicating a device that is a move source or a copy source of content may be recorded in the use control information (usage file) and the information may be provided to the memory card.

By setting the configuration in this way, when the content and the management information recorded in the memory card are returned to the original device, it becomes possible to refer to the use control information (usage file) to confirm the provider of the content, and to return the content to the device, which has output the content, without error.

Further, it has been described that the domain key held by the device is output from the device to the memory card as it is in the sequence described with reference to FIG. 10. However, it may be configured such that the domain key is transformed to generate a transformation domain key according to a transformation algorithm set in advance, and the transformation domain key is provided to the memory card and stored therein, instead of outputting the domain key as it is.

However, in this case, in the reproduction device that executes content reproduction, the transformation domain key is returned to the original domain key by executing inverse transformation algorithm, and then subsequent processes are performed.

In addition, as the management information output by the device to the memory card, further, content use control standard information in the original device, for example, Marlin (Marlin 0×00) may be set.

In addition, it may be configured such that information about the number of available devices capable of simultaneously using content permitted in the content use control standard in the original device and information about the number of remaining available devices based on the output of content this time are held in the device, and are also output to the memory card.

With this process, when an output is performed to a plurality of memory cards, it becomes possible to control the output of content within a range according to the original content use control standard.

[8. Reproduction Sequence of Content Stored in Memory Card]

Figure 11:
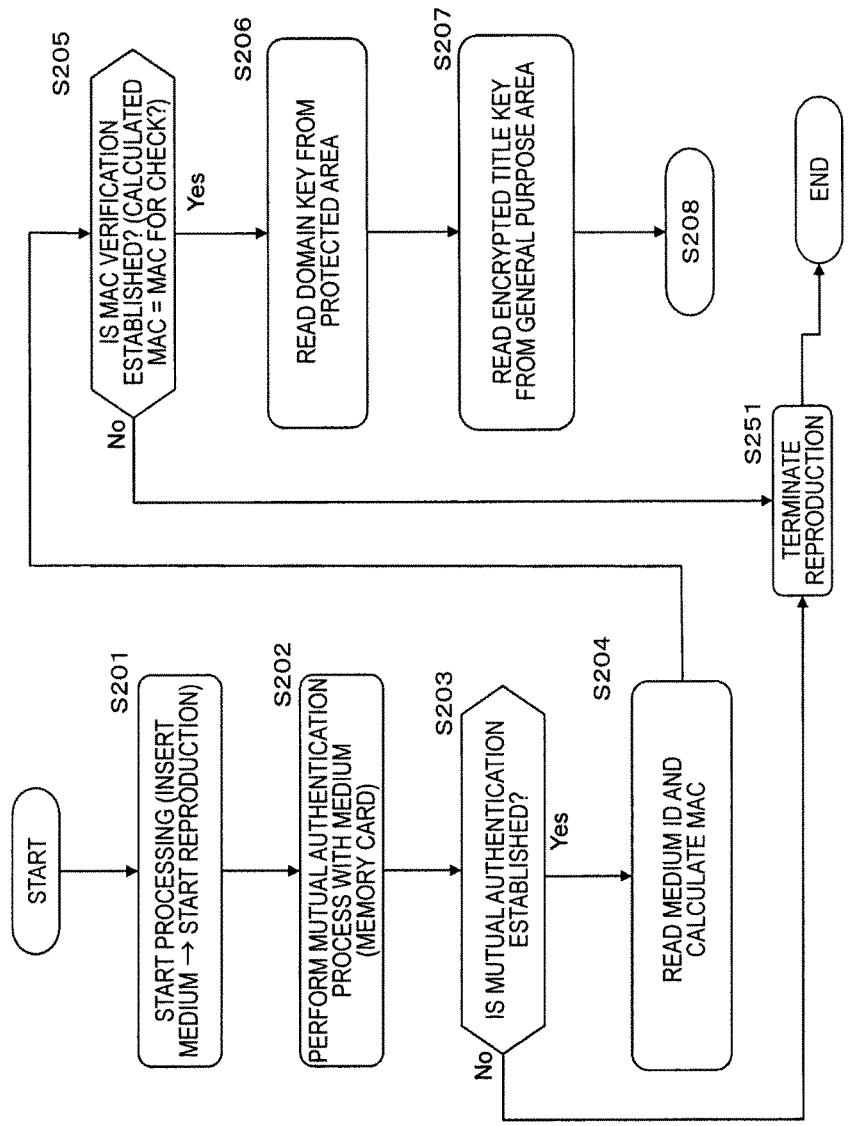
FIG. 11 is a diagram illustrating a flowchart describing a process sequence of reproducing content.

Next, a sequence of reproducing content by a device, to which a memory card that records content and information according to the sequence with reference to FIG. 10 is loaded, for example, by the reproduction device 131 as the non-domain device illustrated in FIG. 4 will be described with reference to the flowcharts illustrated in FIGS. 11 and 12.

Note that a program for executing a reproduction sequence according to a flow described below is stored in the reproduction device 131, and various processes associated with reproduction according to the program, for example, a decryption process of content, verification of the management information, verification of content to which the management information is applied, and the like are executed.

In step S201 illustrated in FIG. 10, the reproduction device loads a medium (memory card) in which content to be reproduced, the management information, and the domain key are stored, and selects the content to be reproduced by user designation of the content, and the like.

In step S202, the cross-authentication process is executed between the reproduction device and the memory card. For example, the cross-authentication process including exchange of the mutual public key certificates according to the public key encryption method is performed. Note that the reproduction device holds a certificate in which the public key issued by the authentication station is stored and a secret key. The memory card also receives the pair of the public key certificate and the secret key from the authentication station in advance, and stores the pair in the own storage unit.

If the cross-authentication between the reproduction device and the memory card is not established (determination of step S203=No), the process proceeds to step S251 and the content reproduction is terminated.

If the cross-authentication between the reproduction device and the memory card is established, and the mutual validity is confirmed (determination of step S203=Yes), the process proceeds to step S204.

In step S204, the reproduction device retrieves the media ID that is the identification information of the memory card from the certificate received from the memory card in the authentication process, and calculates a MAC.

Next, in step S205, the reproduction device performs a matching process between the calculated MAC value and the media ID verification value (MAC) read out from the general purpose area of the memory card. If the two MAC values are matched, the memory card determines that it is a medium in which the content is recorded according to a correct sequence described with reference to FIG. 10 (determination of step S205=Yes), and proceeds to step S206.

If the two MAC values are not matched, the memory card determines that it is not the media in which the content is recorded according to the correct sequence described with reference to FIG. 10 (determination of step S205=No), and proceeds to step S251 and terminates the content reproduction.

When it is determined that the determination of step S205=Yes and the memory card determines that it is a medium in which the content is recorded according to the correct sequence described with reference to FIG. 10, the process proceeds to step S206, and the reproduction device reads the domain key from the protected area of the memory card.

Note that, as described above, in accessing the protected area of the memory card, the access right determination process by the memory card based on the presentation of the certificate is necessary.

The memory card refers to the certificate received from the reproduction device in the authentication process, and confirms the record of the access right with respect to the protected area recorded in the certificate, in response to the request of reading the domain key from the reproduction device. The reproduction device reads the domain key only when the read permission information with respect to the divided areas of the protected area, in which the domain key is recorded as the access right information, is recorded. If there is no record, the domain key is not read, and the content reproduction process is not executed.

When the domain key is read based on the confirmation of the access right by the reproduction device, in step S207, the reproduction device reads the encrypted title key from the general purpose area of the memory card.

Figure 12:
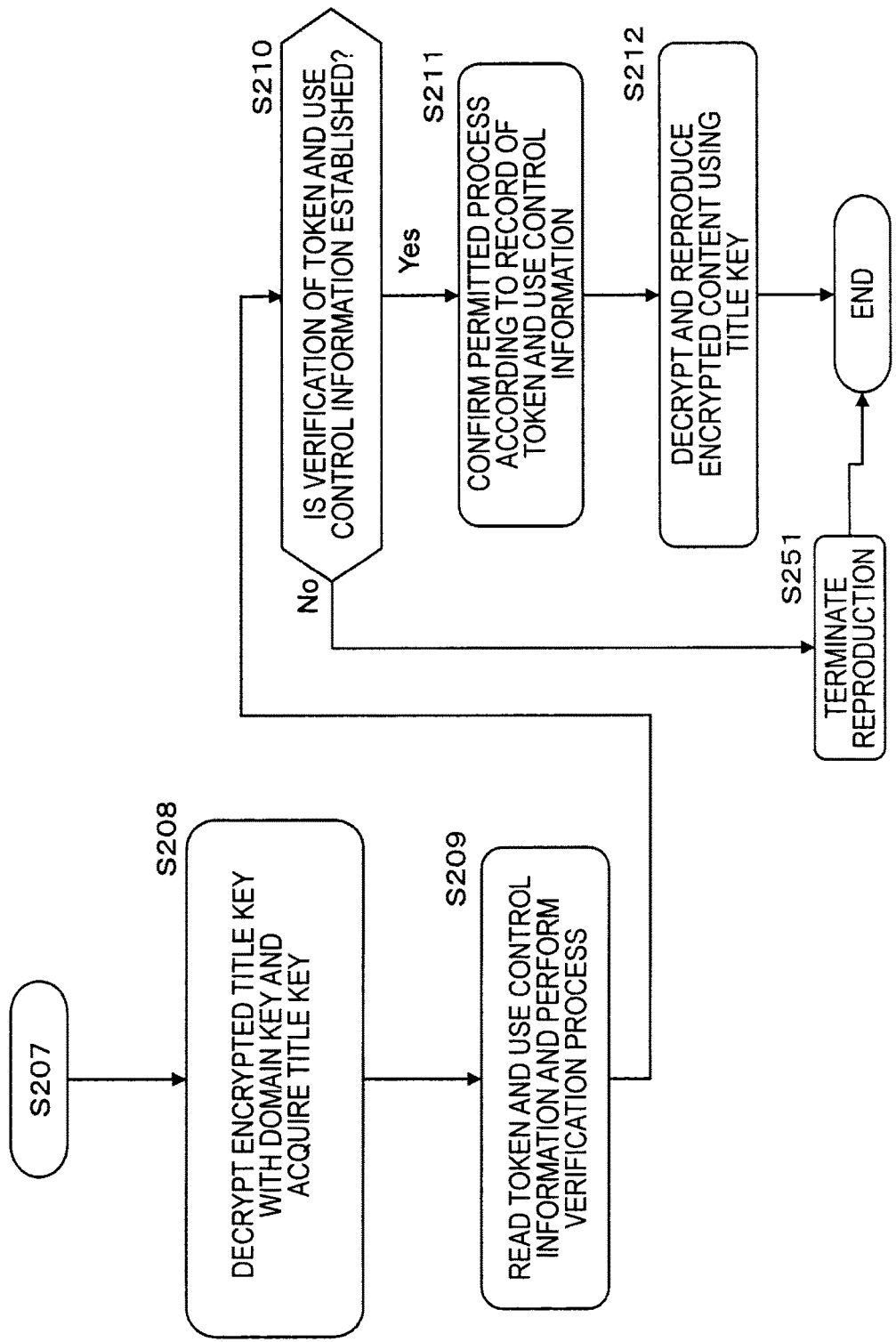
FIG. 12 is a diagram illustrating a flowchart describing the process sequence of reproducing content.

Next, in step S208 illustrated in FIG. 12, the reproduction device decrypts the encrypted title key read from the general purpose area of the memory card using the acquired domain key to acquire a title key.

Next, in step S209, the reproduction device reads the token and the use control information from the general purpose area of the memory card, and executes signature verification for falsification verification set to the data.

When it is determined that the verification is established in step S210, the process proceeds to step S211, and when the verification is not established, the process proceeds to step S251 and the reproducing process is terminated.

When it is determined that the verification is established in step S210, and the validity of the token and the use control information is confirmed, the process proceeds to step S211, and verification of the content and confirmation of the permitted process are executed based on the configuration data of the token and the use control information.

Next, in step S212, the reproduction device decrypts the encrypted content read from the general purpose area of the memory card by applying the title key acquired in step S208 to reproduce the content.

In this way, in the content reproduction process, the reproduction device
can acquire the domain key recorded in the protected area of the memory card,
can acquire the title key by decryption of the encrypted title key with the acquired domain key, and
can acquire the content by decryption of the encrypted content with the acquired title key.

Therefore, the reproduction device can execute content reproduction.

In the present process, with the verification of the media ID MAC, it becomes possible to confirm the content has been recorded in the medium by the valid sequence under observation of the management server.

For example, when a media in which content is recorded outside the observation of the management server by a process other than the sequence illustrated in FIG. 10 is used, the verification of the media ID MAC in step S205 is not established, the content reproduction is terminated, and unauthorized use of the content is prevented.

[9. Hardware Configuration Example of Devices]

Figure 13:
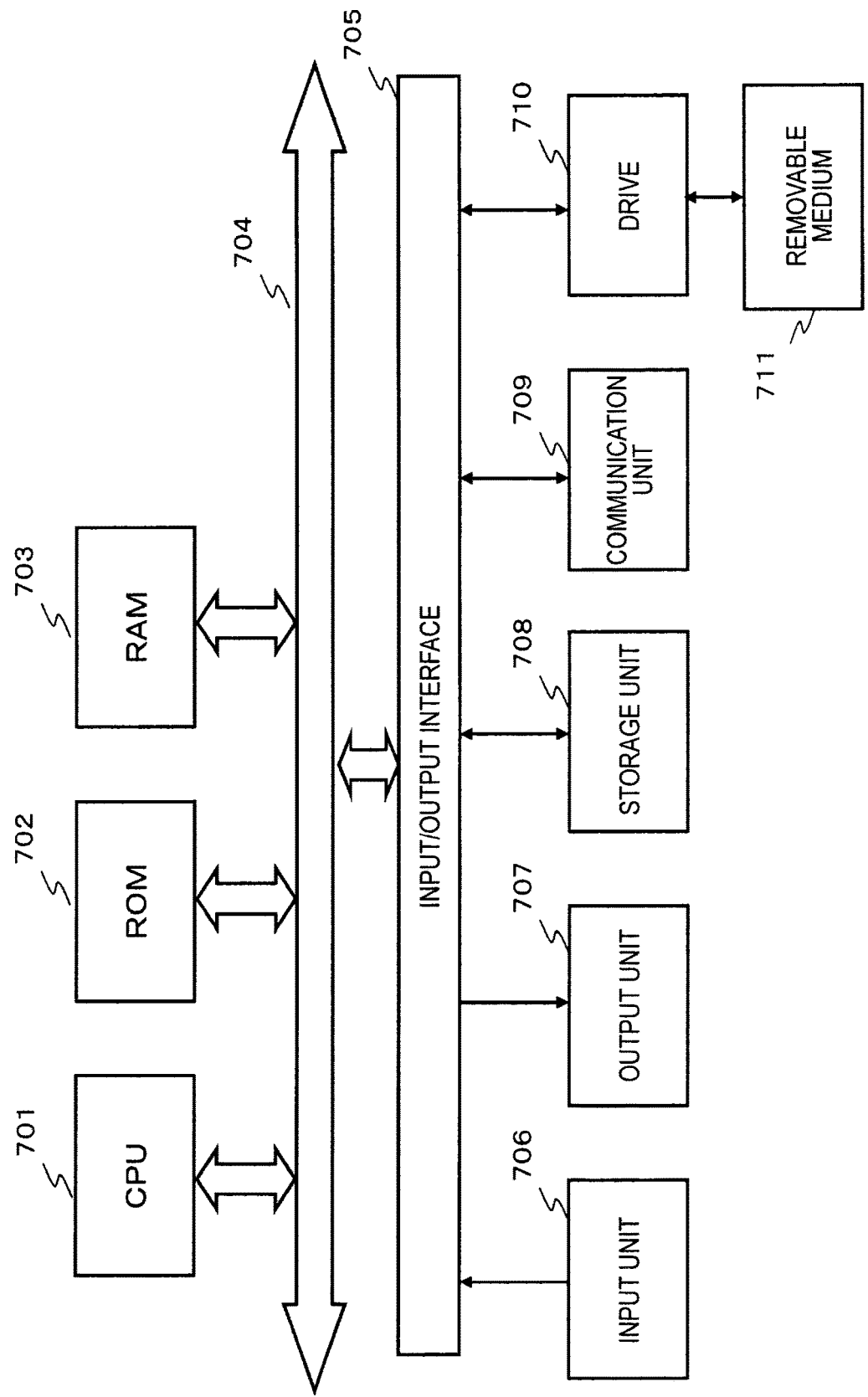
FIG. 13 is a diagram describing a hardware configuration example of a host device that loads the memory card and performs recording and reproducing processes of data.

Finally, an example of a hardware configuration of the devices that perform the above-described processes will be described with reference to FIGS. 13 and 14.

First, an example of a hardware configuration of the host device that loads a memory card therein and performs the processes of recording and reproducing data will be described with reference to FIG. 13.

A central processing unit (CPU) 701 functions as the data processing unit that executes various processes according to the program stored in a read only memory (ROM) 702 or a storage unit 708. For example, the CPU 701 executes communication with the server, recording of data received from the server in the memory card (a removable medium 711 in the drawing), reproducing of data from the memory card (the removable medium 711 in the drawing) described in the embodiments. The program executed by the CPU 701, data, and the like are appropriately stored in a random access memory (RAM) 703. The CPU 701, the ROM 702, and the RAM 703 are connected to each other by a bus 704.

The CPU 701 is connected to an input/output interface 705 through the bus 704. The input/output interface 705 is connected to an input unit 706 including various switches, a keyboard, a mouse, and a microphone, and an output unit 707 including a display and a speaker. The CPU 701 executes various processes in accordance with instructions input from the input unit 706, and outputs processing results, for example, to the output unit 707.

The storage unit 708 connected to the input/output interface 705 is formed of a hard disk, for example, and stores the program executed by the CPU 701 and various data. A communication unit 709 communicates with external devices through a network such as the Internet or a local area network.

A drive 710 connected to the input/output interface 705 drives the removable medium 711 such as a magnetic disc, an optical disc, an opto-magnetic disc, or a semiconductor memory to acquire various data such as content or key information recorded thereon. For example, the content is decoded and reproduced in accordance with a reproduction program executed by the CPU using the acquired content and key data.

FIG. 14 illustrates an example of a hardware configuration of the memory card.

A central processing unit (CPU) 801 functions as the data processing unit that executes various processes in accordance with the program stored in a read only memory (ROM) 802 or a storage unit 807. For example, the CPU 801 executes communication with the server and the host device, writing and reading of data to/from the storage unit 807, determination of the accessibility of each divided area of a protected area 811 of the storage unit 807 described in the embodiments. The program executed by the CPU 801, data, and the like are appropriately stored in a random access memory (RAM) 803. The CPU 801, the ROM 802, and the RAM 803 are connected to each other by a bus 804.

The CPU 801 is connected to an input/output interface 805 through the bus 804. The input/output interface 805 is connected to a communication unit 806 and the storage unit 807.

The communication unit 804 connected to the input/output interface 805 communicates with the server and the host device, for example. The storage unit 807 is a data storage area, and as described above, includes the protected area 811 in which access restriction is set and a general purpose area 812 in which data can be freely recorded and read.

Note that the server can be realized by a device having a similar hardware configuration to the host device illustrated in FIG. 12, for example.

[10. Summary of Configuration of Present Disclosure]

The present disclosure has been described with reference to the specific embodiments. However, it is obvious for those skilled in the art that the embodiments can be modified in various forms without departing from the spirit and scope of the present disclosure. That is, the present invention has been exemplarily described and should not be construed in a limited manner. The spirit and scope of the present disclosure can be understood from the appended claims.

Note that, the technique disclosed in the present specification may be configured as follows:

(1) A content use system including:

a content output device configured to output content to be controlled and used;

a medium configured to have the content be input from the content output device and to store the content;

a reproduction device configured to load the medium and to reproduce the content; and a management server configured to execute control of a recording process of the content to the medium, wherein the content output device outputs encrypted content and an encryption key to be applied to a process of using encrypted content to the medium, the management server generates a media ID verification value that is a verification value based on a media ID that is an identifier of the medium, and transmits the media ID verification value to the medium, the medium stores the encrypted content, the encryption key, and the media ID verification value in a storage unit, and the reproduction device loads the medium, calculates a verification value based on the media ID acquired from the medium, and executes a process of reproducing the encrypted content stored in the medium by data processing to which the encryption key is applied on condition that a matching process between the calculated verification value and the media ID verification value stored in the medium is established.

(2) The content use system according to (1), wherein the medium includes a protected area in which an access is permitted based on accessibility determination with respect to the storage unit of the medium by verification of a certificate of a device that requests an access, and a general purpose area in which the accessibility determination by the verification of a certificate of a device that requests an access is not necessary, stores the encryption key in the protected area in which access permission is determined based on verification of a certificate of the content output device, and outputs the encryption key recorded in the protected area in which access permission is determined to the reproduction device based on verification of a certificate of the reproduction device, in response to a request of reading of the encryption key by the reproduction device.

(3) The content use system according to (1) or (2), wherein the encrypted content is encrypted content encrypted with a title key, the encryption key is a domain key or a transformation key of a domain key to be applied to an encryption process or an decryption process with respect to the title key, and the content output device outputs, to the medium, the encrypted content, and an encrypted title key encrypted with the domain key.

(4) The content use system according to any one of (1) to (3), wherein the domain key is an encryption key provided by the management server to a domain device permitted to use content.

(5) The content use system according to any one of (1) to (3), wherein the content output device is a domain device holding the domain key and permitted to use content, and the reproduction device a non-domain device not holding the domain key.

(6) An information processing device including:

a data processing unit; and a storage unit, wherein the storage unit is divided into a protected area in which an access is permitted based on accessibility determination by verification of a certificate of a device that requests an access, and a general purpose area in which the accessibility determination by the verification of a certificate of a device that requests an access is not necessary, stores, in the general purpose area, encrypted content, and a media ID verification value generated based on a media ID that is an identifier of the own device, and stores, in the protected area, an encryption key to be applied to a process of using the encrypted content, and the data processing unit verifies a certificate provided from a reproduction device that is to use the encrypted content, and permits reading of the encryption key by the reproduction device in accordance with confirmation of access right with respect to the protected area, and outputs a media ID to the reproduction device, and enables determination of content reproduction availability based on a matching process between a calculated verification value based on a media ID in the reproduction device and a media ID verification value stored in the general purpose area.

(7) The information processing device according to (6), wherein the data processing unit,
in a process of recording the encrypted content in the general purpose area,
transmits the media ID to a management server, and receives a media ID verification value generated by the management server and stores the media ID verification value in the general purpose area.

(8) The information processing device according to (6) or (7),
wherein the data processing unit
stores, in the general purpose area, encrypted content provided from a content output device, and an encrypted title key obtained by encrypting a title key that is an encryption key of the encrypted content, and
stores, in the protected area, a domain key that is an encryption key of the encrypted title key, and is provided by the management server to a domain device permitted to use content.

(9) An information processing device including:
a data processing unit configured to read encrypted content stored in a medium including a storage unit and to execute an encryption process and a reproduction process,
wherein the medium stores the encrypted content, an encryption key to be applied to a process of using encrypted content, and a media ID verification value that is a verification value based on a media ID that is an identifier of the medium, and
the data processing unit
calculates a verification value based on the media ID acquired from the medium, and executes a process of reproducing the encrypted content stored in the medium by data processing to which the encryption key is applied on condition that a matching process between the calculated verification value and the media ID verification value stored in the medium is established.

(10) The information processing device according to (9), wherein the medium includes a protected area in which an access is permitted based on accessibility determination with respect to the storage unit of the medium by verification of a certificate of a device that requests an access, and a general purpose area in which the accessibility determination by the verification of a certificate of a device that requests an access is not necessary, and the data processing unit provides the medium with a certificate that is a certificate of a reproduction device, and in which access permission information with respect to the protected area is recorded.

(11) The information processing device according to (9) or (10), wherein the encrypted content is encrypted content encrypted with a title, and the encryption key is a domain key or a transformation key of a domain key to be applied to an encryption process and a decryption process of the title key.

(12) The information processing device according to any one of (9) to (11), wherein the domain key is an encryption key provided by a management server to a domain device permitted to use content.

(13) An information processing device including:
a storage unit configured to store encrypted content and an encryption key to be applied to a process of using the encrypted content; and
a data processing unit,
wherein the data processing unit
has a configuration for outputting the encrypted content and the encryption key to a medium to which content is output, and causing the medium to record the encrypted content and the encryption key,
the medium
includes a storage unit divided into a protected area in which an access is permitted based on accessibility determination by verification of a certificate of a device that requests an access, and a general purpose area in which the accessibility determination by the verification of a certificate of a device that requests an access is not necessary, and
the data processing unit
presents a certificate of the own device to the memory card, and writes the encryption key in the protected area in which an access is permitted based on verification of the certificate by the memory card.

Further, methods of processing executed and programs for causing the processing to execute in the above-described device and system are also included in the configurations of the present disclosure.

The series of processes described in this specification can be performed by hardware, software, or a combination thereof. When the processes are performed by software, a program including the process sequence can be installed in and executed by a memory of a computer incorporated into exclusive hardware. Alternatively, the program can be installed in and executed by a general-purpose computer that can execute various processes. For example, the program can be recorded in a recording medium in advance. The program can be installed not only in a computer from a recording medium but also may be received through a network such as a local area network (LAN) and the Internet and installed in a recording medium such as a built-in hard disk.

Note that the various processes described in the specification can be performed in a time series manner according to the description or may be performed in parallel or individually in accordance with the processing capability of the device that executes the processes, or as necessary. The system in this specification is a logical set of a plurality of devices and is not limited to a configuration in which the plurality of devices is disposed in the same housing.

INDUSTRIAL APPLICABILITY

As described above, according to a configuration of one embodiment of the present disclosure, a configuration for outputting content to a medium and using content stored in the medium under control of the use of content is realized.

To be specific, a content-output-device outputs an encrypted content and an encryption key to be applied to a process of using the encrypted content to a medium, and a management server generates a media ID verification value that is a verification value based on a media ID as an identifier of the medium, and transmits the generated media ID verification value to the medium. The medium stores the encrypted content, the encryption key, and the media ID verification value in a storage unit. A reproduction device loads the medium and calculates a verification value based on the media ID acquired from the medium, and executes a process of reproducing encrypted content stored in the medium by data processing to which the encryption key is applied on condition that a matching process performed between the verification value and the media ID verification value stored in the medium is established.

With these processes, media-bind type content use control is realized.

REFERENCE SIGNS LIST

11 Management server
21 PC
22 Reproduction device
23 Television
30
40 Storage unit
41 Encrypted content
42 Encrypted content key
43 License information
50 Secure storage unit
51 Domain key
70 Memory card
101 Management server
102 Content providing server
121 PC
122 Reproducing device
123 Television
131 Reproduction device
200 Memory card
210 Protected area
220 General purpose area
211, 212 Divided area
310, 320 Encrypted content file
311, 321 Security box
330, 340 Management information
331, 341 Token
332, 342 Use control information
333, 343 Media ID verification value (MAC)
334, 344 Encrypted title key
360 Media certificate
381 Domain key
701 CPU
702 ROM
703 RAM
704 Bus
705 Input/output interface
706 Input unit
707 Output unit
708 Storage unit
709 Communication unit
710 Drive
711 Removable medium
801 CPU
802 ROM
803 RAM
804 Bus
805 Input/output interface
806 Communication unit
807 Storage unit
811 Protected area
812 General purpose area

The invention claimed is:

1. A content use system, comprising:
a content output device configured to output encrypted content and an encryption key to apply on the encrypted content in an encryption process;
a medium including a plurality of protected areas and a general purpose area, wherein the medium is configured to receive and store the encrypted content in the general purpose area and the encryption key in at least one protected area of the plurality of protected areas;
a management server configured to:
control a recording process of the encrypted content to the medium,
set a server ID in a first certificate that is included in the encrypted content,
generate a media ID verification value based on a media ID that is an identifier of the medium, and
transmit the media ID verification value to the medium; and
a reproduction device configured to:
load the medium,
calculate a verification value based on the media ID, and
reproduce the encrypted content stored in the medium by the encryption process in which the encryption key is applied based on a condition that a match between the calculated verification value and the media ID verification value stored in the medium is established,
wherein, an access to the at least one protected area of the plurality of protected areas is permitted based on information stored in a second certificate of the content output device or the reproduction device that is configured to request the access, wherein the information stored in the second certificate indicates at least one access right specific to the at least one protected area of the plurality of protected areas, and
wherein the access to the at least one protected area of the plurality of protected areas is further based on a cross-authentication between the first certificate of the management server and the second certificate of the content output device or the reproduction device.

2. The content use system according to claim 1, wherein
the general purpose area is at least one area in which accessibility determination, based on the information stored in the second certificate of the content output device or the reproduction device that is configured to request the access, is optional, and
the medium is further configured to:
output the encryption key stored in the at least one protected area of the plurality of protected areas, in which access permission is determined, to the reproduction device based on the information stored in the second certificate of the reproduction device, wherein the access permission is determined based on a read request of the encryption key made by the reproduction device.

3. The content use system according to claim 1, wherein
the encrypted content is content encrypted with a title key,
the encryption key is a domain key or a transformation key of the domain key applied to the encryption process or a decryption process with respect to the title key, and
wherein the content output device is configured to output, to the medium, the encrypted content, and an encrypted title key encrypted with the domain key.

4. The content use system according to claim 3,
wherein the domain key is provided by the management server to a domain device permitted to use the encrypted content.

5. The content use system according to claim 4, wherein
the content output device is the domain device that is configured to hold the domain key and permitted to use the encrypted content, and
the reproduction device is a non-domain device.

6. An information processing device, comprising:
a data processing unit; and
a storage unit, wherein the storage unit is divided into a plurality of protected areas in which an access to at least one protected area of the plurality of protected areas is permitted based on accessibility determination of a device that is configured to request the access to the at least one protected area of the plurality of protected areas, and a general purpose area in which the accessibility determination of the device that is configured to request the access is optional, wherein the storage unit is configured to:
store, in the general purpose area, encrypted content, and a media ID verification value generated based on a media ID that is an identifier of the information processing device,
store a server ID in a first certificate that is included in the encrypted content, wherein the first certificate is set by a management server, and
store, in at least one protected area of the plurality of protected areas, an encryption key applied on the encrypted content in an encryption process, wherein the data processing unit, based on information stored in a second certificate of a reproduction device to use the encrypted content, is configured to:
permit the encryption key to be read by the reproduction device based on confirmation of access right with respect to corresponding one of the plurality of protected areas, wherein the information stored in the second certificate indicates at least one access right specific to the at least one protected area of the plurality of protected areas, and
output the media ID to the reproduction device, and enable determination of content reproduction availability based on a condition that a match between a calculated verification value based on the media ID in the reproduction device and the media ID verification value stored in the general purpose area is established,
wherein the access to the at least one protected area of the plurality of protected areas is based on a cross-authentication between the first certificate of the management server and the second certificate of the reproduction device.

7. The information processing device according to claim 6, wherein the data processing unit, based on the encrypted content recorded in the general purpose area, is configured to:
transmit the media ID to the management server,
receive the media ID verification value generated by the management server, and
store the media ID verification value in the general purpose area.

8. The information processing device according to claim 6,
wherein the storage unit is further configured to:
store, in the general purpose area, the encrypted content from a content output device, and an encrypted title key obtained by encryption of a title key that is a first encryption key of the encrypted content, and
store, in one of the plurality of protected areas, a domain key that is a second encryption key of the encrypted title key, which is provided by the management server to a domain device permitted to use the encrypted content.

9. An information processing device, comprising:
a data processing unit configured to read encrypted content and to execute an encryption process and a reproduction process; and
a storage unit included in a medium,
wherein the medium includes a plurality of protected areas, in which an access to at least one protected area of the plurality of protected areas is permitted based on information stored in a first certificate of a device that is configured to request the access, wherein the information stored in the first certificate indicates at least one access right specific to the at least one protected area of the plurality of protected areas, and a general purpose area,
wherein the medium is configured to store a server ID in a second certificate that is included in the encrypted content, store the encrypted content and a media ID verification value that is a verification value based on a media ID that is an identifier of the medium in the general purpose area, and an encryption key to be applied on the encrypted content in the encryption process in the at least one protected area of the plurality of protected areas, wherein the second certificate is set by a management server and
wherein the data processing unit is further configured to:
calculate the verification value based on the media ID acquired from the medium, and
reproduce the encrypted content stored in the medium by the encryption process in which the encryption key is applied based on condition that a match between the calculated verification value and the media ID verification value stored in the medium is established,
wherein the access to the at least one protected area of the plurality of protected areas is further based on a cross-authentication between the first certificate of the device and the second certificate of the management server.

10. The information processing device according to claim 9, wherein the general purpose area is at least one area in which accessibility determination based on the information stored in the first certificate of the device that is configured to request the access is optional, and
the data processing unit is configured to provide the medium with a third certificate corresponding to a reproduction device, and in which access permission information with respect to one of the plurality of protected areas is recorded.

11. The information processing device according to claim 9, wherein the encrypted content is content encrypted with a title key, and
the encryption key is a domain key or a transformation key of the domain key applied to the encryption process and a decryption process of the title key.

12. The information processing device according to claim 11, wherein the domain key is provided by the management server to a domain device permitted to use the encrypted content.

13. An information processing device, comprising:
a storage unit configured to:
store encrypted content and an encryption key to be applied on the encrypted content in an encryption process; and
store a server ID in a first certificate that is included in the encrypted content,
wherein the first certificate is set by a management server,; and
a data processing unit,
wherein the data processing unit is configured to output the encrypted content and the encryption key to a medium to which the encrypted content is output,
wherein the medium includes the storage unit divided into a plurality of protected areas, in which an access to at least one protected area of the plurality of protected areas is permitted based on accessibility determination of a device that is configured to request the access to the at least one protected area of the plurality of protected areas, and a general purpose area in which the accessibility determination of the device that is configured to request the access is optional, and wherein the data processing unit is configured to present a second certificate of the information processing device to the medium, and write the encryption key in the at least one protected area of the plurality of protected areas in which the access is permitted based on information stored in the second certificate, the information stored in the second certificate indicates at least one access right specific to the at least one protected area of the plurality of protected areas, and wherein the access to the at least one protected area of the plurality of protected areas is based on a cross-authentication between the first certificate of the management server and the second certificate of the information processing device.

14. An information processing method, comprising:

in an information processing device including a data processing unit and a storage unit, wherein the storage unit is divided into a plurality of protected areas, in which an access to at least one protected area of the plurality of protected areas is permitted based on accessibility determination of a device that is configured to request the access, and a general purpose area in which the accessibility determination of the device that is configured to request the access is optional:
  storing, by the storage unit, in the general purpose area, encrypted content, and a media ID verification value generated based on a media ID that is an identifier of the information processing device, and
  storing a server ID in a first certificate that is included in the encrypted content, wherein the first certificate is set by a management server,
  storing, by the storage unit, in the at least one protected area of the plurality of protected areas, an encryption key to be applied on the encrypted content in an encryption process,
  based on information stored in a second certificate of a reproduction device to use the encrypted content, permitting, by the data processing unit, reading of the encryption key by the reproduction device based on confirmation of access right with respect to the at least one protected area of the plurality of protected areas, wherein the information stored in the second certificate indicates at least one access right specific to the at least one protected area of the plurality of protected areas, and
  outputting, by the data processing unit, the media ID to the reproduction device, and enabling determination of content reproduction availability based on a condition that match between a calculated verification value based on the media ID in the reproduction device and the media ID verification value stored in the general purpose area is established,
  wherein the access to the at least one protected area of the plurality of protected areas is based on a cross-authentication between the first certificate of the management server and the second certificate of the reproduction device.

15. An information processing method, comprising:
in an information processing device:
executing, by a data processing unit of the information processing device, reading of encrypted content stored in a medium and executing an encryption process and a reproduction process, wherein the medium includes a plurality of protected areas, in which an access to at least one protected area of the plurality of protected areas is permitted based on information stored in a first certificate of a device that requests the access, and a general purpose area, wherein the information stored in the first certificate indicating at least one access right specific to the at least one protected area of the plurality of protected areas;

storing a server ID in a second certificate that is included in the encrypted content, wherein the second certificate is set by a management server;

storing the encrypted content and a media ID verification value that is a verification value based on a media ID that is an identifier of the medium in the general purpose area of the medium, and an encryption key to be applied on the encrypted content in the encryption process in the at least one protected area of the plurality of protected areas of the medium; and calculating, by the data processing unit, the verification value based on the media ID acquired from the medium, and reproducing the encrypted content stored in the medium by data processing to which the encryption key is applied based on condition that a match between the calculated verification value and the media ID verification value stored in the medium is established, wherein the access to the at least one protected area of the plurality of protected areas is based on a cross-authentication between the first certificate of the device and the second certificate of the management server.

16. A non-transitory computer readable medium having stored thereon, computer-executable instructions, which when executed by a processor, cause an information processing device to execute operations, the operations comprising:

executing, by a data processing unit of the information processing device, reading of encrypted content stored in a medium and executing an encryption process and a reproduction process, wherein the medium includes a plurality of protected areas, in which an access to at least one protected area of the plurality of protected areas is permitted based on information stored in a first certificate of a device that is configured to request the access, the information stored in the first certificate indicating at least one access right specific to the at least one protected area of the plurality of protected areas, and a general purpose area;

storing a server ID in a second certificate included in the encrypted content, wherein the second certificate is set by a management server;

storing, the encrypted content and a media ID verification value that is a verification value based on a media ID that is an identifier of the medium in the general purpose area of the medium, and an encryption key to be applied on the encrypted content in the encryption process in the at least one protected area of the plurality of protected areas of the medium; and calculating, by the data processing unit, the verification value based on the media ID acquired from the medium, and reproducing the encrypted content stored in the medium by data processing to which the encryption key is applied on condition that a match between the calculated verification value and the media ID verification value stored in the medium is established, wherein the access to the at least one protected area of the plurality of protected areas is based on a cross-authentication between the first certificate of the device and the second certificate of the management server.

\* \* \* \* \*